US006513031B1

(12) United States Patent
Fries et al.

(10) Patent No.: US 6,513,031 B1
(45) Date of Patent: Jan. 28, 2003

(54) SYSTEM FOR IMPROVING SEARCH AREA SELECTION

(75) Inventors: Karen E. Fries, Seattle, WA (US); John M. Tippett, Seattle, WA (US); Jeffrey Richter, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/219,271

(22) Filed: Dec. 23, 1998

(51) Int. Cl.[7] .............................................. G06F 17/30
(52) U.S. Cl. ................................................ 707/3; 707/5
(58) Field of Search ............................. 707/1, 3, 5, 4, 707/200

(56) References Cited

U.S. PATENT DOCUMENTS

| | | | | |
|---|---|---|---|---|
| 5,175,814 A | * | 12/1992 | Anick et al. ................ 345/348 |
| 5,467,448 A | | 11/1995 | Hilton et al. ............... 395/148 |
| 5,696,962 A | * | 12/1997 | Kuplec ........................... 707/4 |
| 5,721,897 A | * | 2/1998 | Rubinstein ..................... 707/3 |
| 5,737,592 A | * | 4/1998 | Nguyen et al. ................ 707/4 |
| 5,778,363 A | | 7/1998 | Light ............................. 707/5 |
| 5,818,462 A | | 10/1998 | Marks et al. ............... 345/473 |
| 5,822,731 A | | 10/1998 | Schultz .................... 704/270.1 |
| 5,864,846 A | * | 1/1999 | Vorhees et al. ................ 707/5 |
| 5,913,205 A | | 6/1999 | Jain et al. ...................... 707/2 |
| 5,974,412 A | * | 10/1999 | Hazelhurst et al. ............ 707/3 |
| 5,974,413 A | | 10/1999 | Beauregard et al. ........... 707/6 |
| 5,987,446 A | * | 11/1999 | Corey et al. ................... 707/3 |
| 5,987,454 A | * | 11/1999 | Hobbs ........................... 707/4 |
| 6,009,410 A | | 12/1999 | LeMole et al. ............... 705/14 |
| 6,070,157 A | * | 5/2000 | Jaconsen et al. ............... 707/1 |
| 6,078,914 A | * | 6/2000 | Redfern ........................ 707/3 |
| 6,199,061 B1 | | 3/2001 | Blewett et al. ................ 707/3 |
| 6,236,987 B1 | | 5/2001 | Horowitz et al. ............. 707/3 |
| 6,247,021 B1 | | 6/2001 | Himmel et al. ............ 707/104 |
| 6,279,017 B1 | | 8/2001 | Walker ....................... 707/529 |

OTHER PUBLICATIONS

Internet Site, "http://www.altavista.digital.com/cgi–bin/query?pg=q&what=web&q–jojo", Mar. 12, 1998.
Internet Site, "http://www.cs.colostate.edu/~dreiling/smartform.html", Mar. 12, 1998.
Internet Site, "http://www.cyber411.com/main.htm", Mar. 12, 1998.
Internet Site, "http://www.dogpile.com/", Mar. 12, 1998.
Internet Site, "http://www.excite.com", Mar. 12, 1998.
Internet Site, "http://www.highway61.com/yak.html", Mar. 12, 1998.
Internet Site, "http://www.hotbot.com/", Mar. 12, 1998.
Internet Site, "http://www.hotbot.com/?MT=&SM=MC&DV=7&RG=.com&DC=10&DE&Ops=MDRTP&_v=&DU=day", Mar. 12, 1998.
Internet Site, "http://www.infoseek.com/", Mar. 12, 1998.
Internet Site, "http://www.infoseek.com/Help?pg=Home-Help.html", Mar. 12, 1998.
Internet Site, "http://www.isurf.yahoo.com/", Mar. 12, 1998.
Internet Site, "http://www.kresch.com/oss/oss.htm", Mar. 12, 1998.

(List continued on next page.)

Primary Examiner—Diane D. Mizrahi
(74) Attorney, Agent, or Firm—Theodore M. Magee; Westman, Champlin & Kelly, P.A.

(57) ABSTRACT

A method of aiding a user in searching a computer environment includes retrieving a search query from a user, accessing a user profile and selecting a search area based on the search query and the user profile. In other embodiments of the present invention, a method provides for receiving a search query, categorizing at least one term in the search query based on an indexed list of terms derived from pages on a network, and identifying at least one search area based on the category of a search term.

5 Claims, 30 Drawing Sheets

I want information on skiing and snowmobiling in Wyoming.

916

OTHER PUBLICATIONS

Internet Site, "http://kresch.com/search/searchme.htm", Mar. 12, 1998.
Internet Site, "http://www.lycos.com/", Mar. 12, 1998.
Internet Site, "http://www.mamma.com/whyuse.html", Mar. 12, 1998.
Internet Site, "http://www.primecomputing.com/ps-search.htm", Mar. 12, 1998.
Internet Site, "http://www.webcrawler.com/", Mar. 12, 1998.
Internet Site, "http://www.yahoo.com/", Mar. 12, 1998.
Internet Site, "http://www.yahoo.com/Computers_and_Internet/Internet/World_Wide_Web/Searching_the_Webs/All_in_One_Search", Mar. 12, 1998.
U.S. patent application Ser. No. 09/221,028, Fries, filed Dec. 23, 1998.
U.S. patent application Ser. No. 09/221,659, Fries et al., filed Dec. 23, 1998.
U.S. patent application Ser. No. 09/221,663, Fries et al., filed Dec. 23, 1998.

* cited by examiner

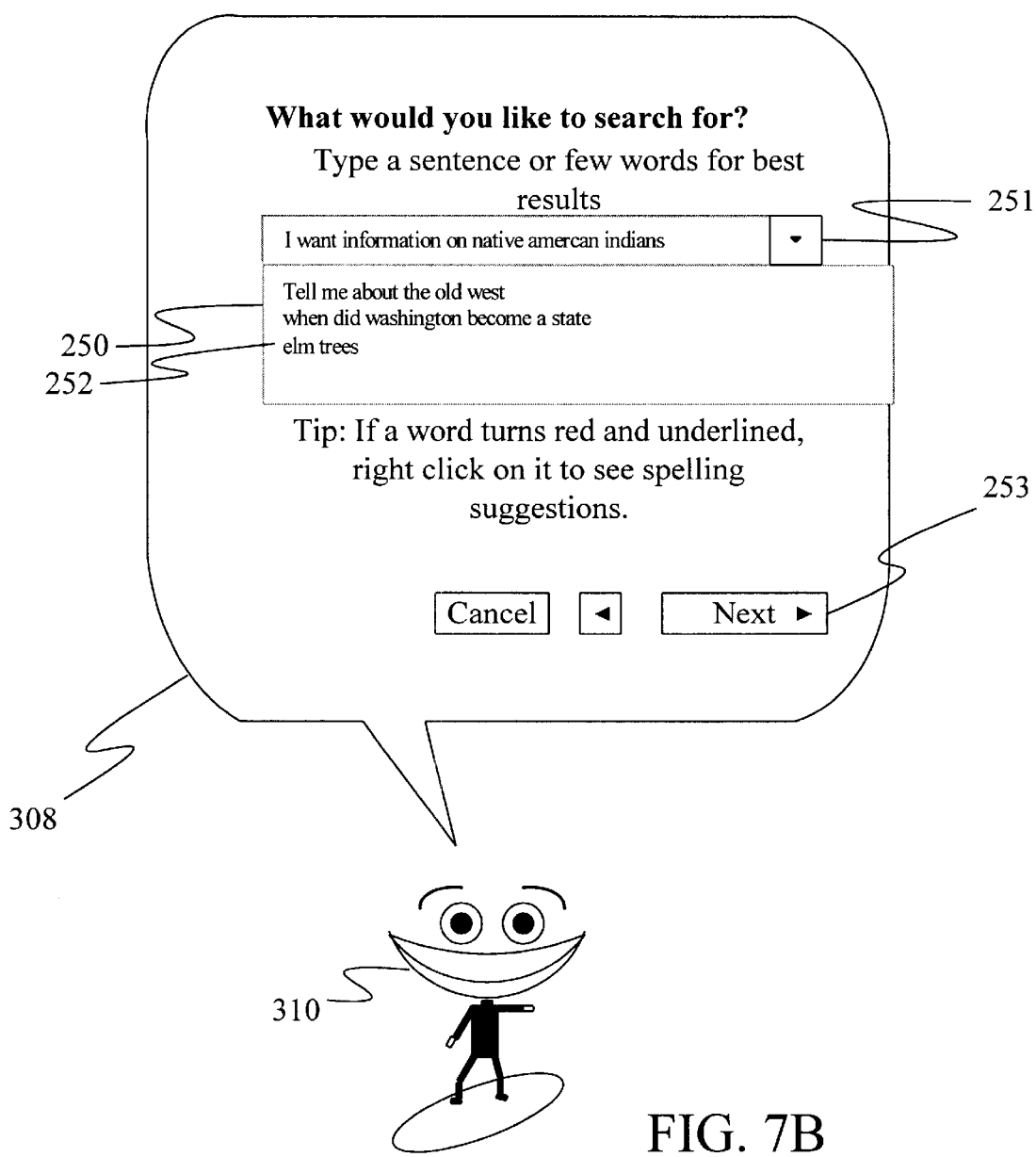

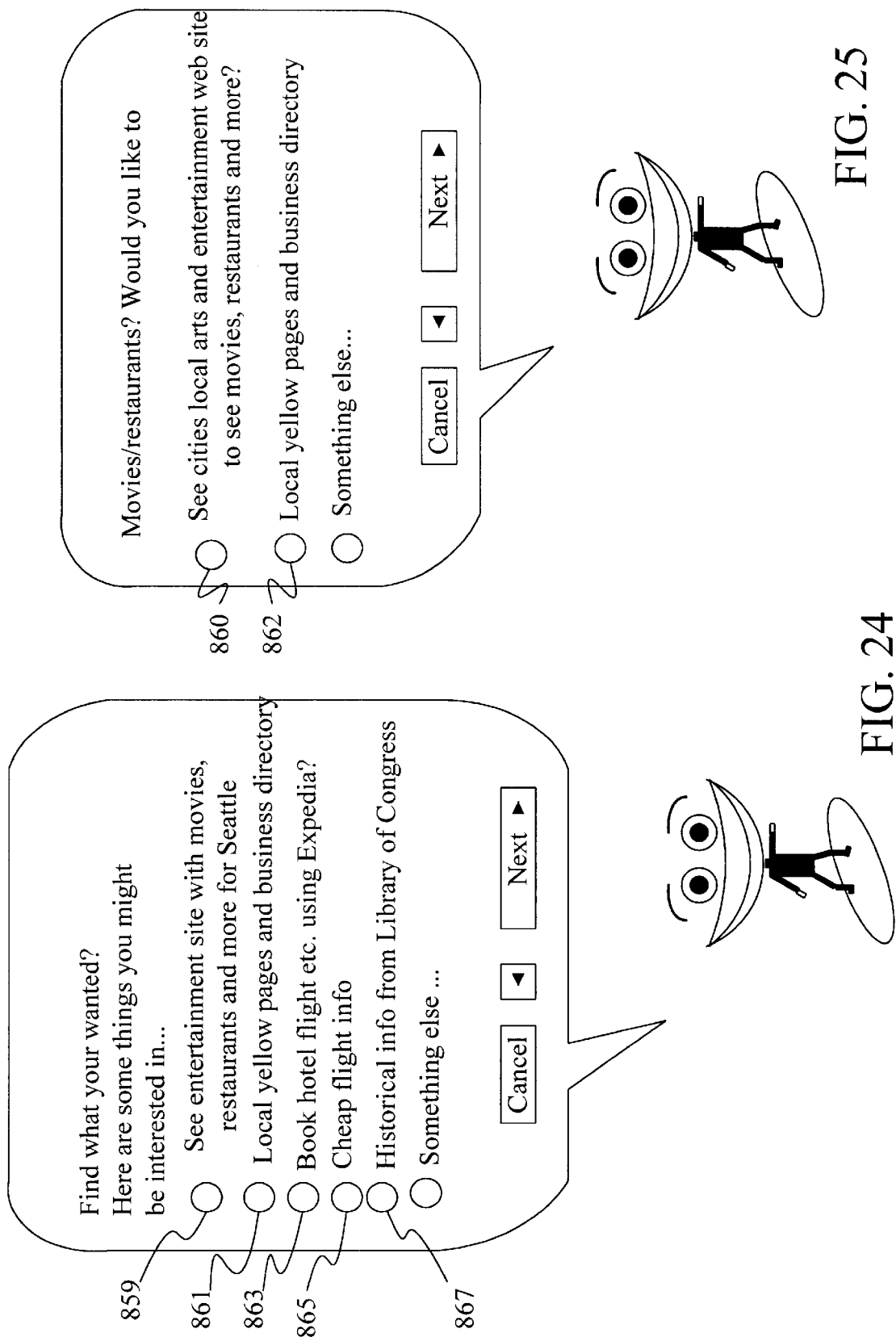

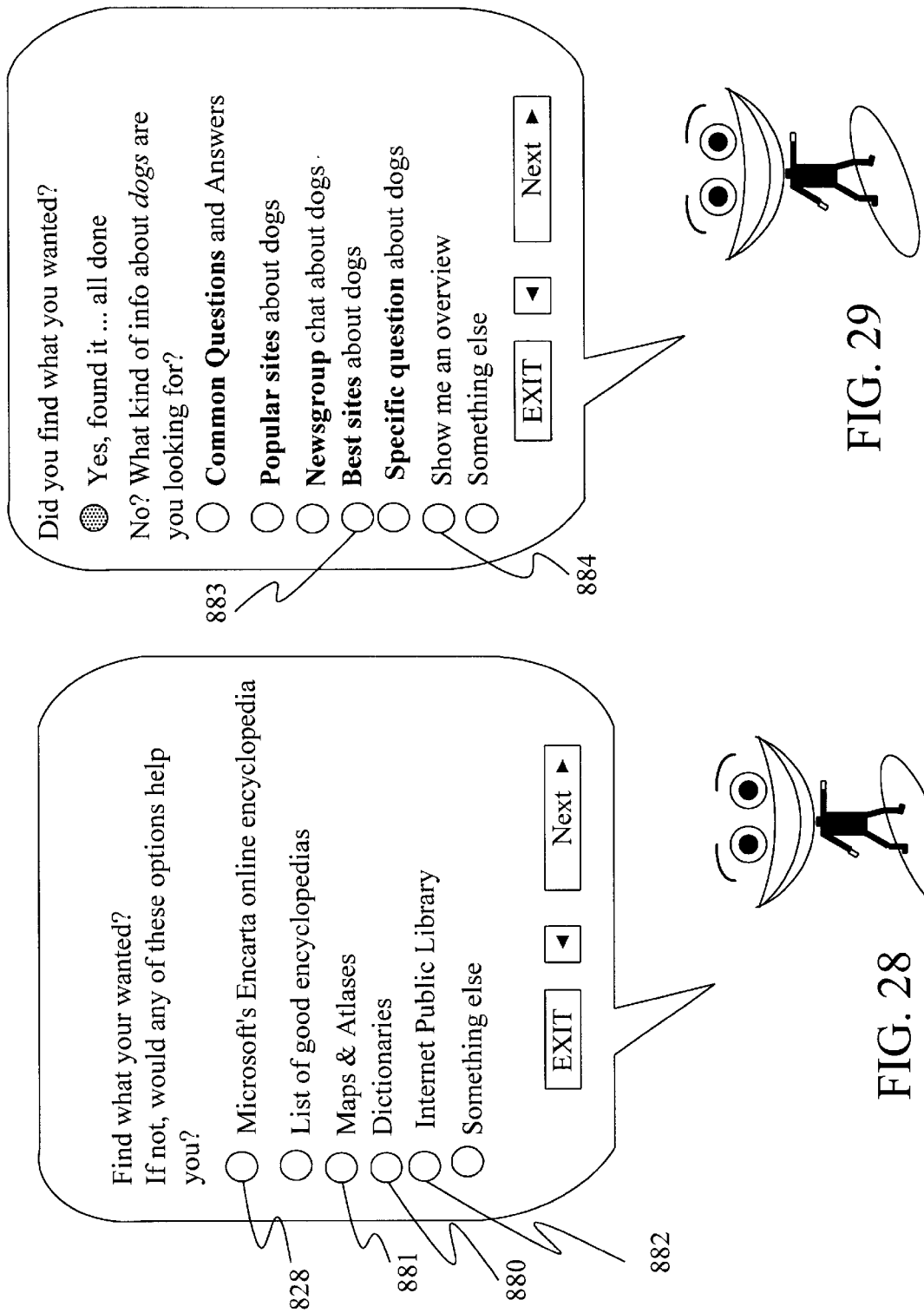

I WANT RECENT ARTICLES ON MICROSOFT WORD

FIG. 31

Would you like to see web pages published during a specific time period?

○ No, show all pages, old and new
○ Yes, new pages, within last 30 days
○ 1 month- 6 months
○ 6 months - 1 year EXIT ▼   Next ▲

FIG. 32

Why do men lose their hair but not women?

FIG. 33

Would you like to exclude pages with the word <women> in them?

○ Yes, exclude women
○ No, don't exclude women

EXIT ▼   Next ▲

FIG. 34

I want information on skiing and snowmobiling in Wyoming.

What better describes what you are looking for. Sites with:

○ either skiing or snowmobiling
○ only pages with both skiing and snowmobiling

Cancel ▼ Next ▲

SYSTEM FOR IMPROVING SEARCH AREA SELECTION

RELATED APPLICATIONS

The present application is related to three applications filed on the same date herewith that are respectively entitled and have serial numbers of SYSTEM FOR ENHANCING A QUERY INTERFACE, Ser. No. 09/221,663; SYSTEM FOR IMPROVING SEARCH TEXT, Ser. No. 09/221,659; and COMPUTERIZED SEARCHING TOOL WITH SPELL CHECKING, Ser. No. 09/221,028.

BACKGROUND OF THE INVENTION

The present invention relates to searching a network for information. In particular, the present invention relates to search tools used in computer searching.

Computer networks connect large numbers of computers together so they may share data and applications. Examples include Intranets that connect computers within a business or institution and the Internet, which connects computers throughout the world.

A single computer can be connected to both an Intranet and the Internet. In such a configuration, the computer can use data and applications found on any of its own storage media such as its hard disc drive, its optical drive, or its tape drive. It can also use data and applications located on another computer connected to the Intranet or Internet. Given the large number of locations from which a computer can extract data and the increasing amount of storage capacity at each of these locations, users have found it increasingly difficult to isolate the information they desire.

In recent years, users have begun to use search engines to help them search the Internet. Typically, search engines accept a search query from the user and then look for the search query's terms in an indexed list of terms. The indexed list is generated by parsing text found on individual Internet pages and indexing the text by the page's Uniform Resource Locator (URL).

Since it is impossible to index every page on the Internet, each search engine selects a set of pages to index. Since each search engine is created by a different group of people, different search engines index different sets of pages. In fact, some search engines have become extremely specialized and only index pages related to a specific category of information such as sports or celebrities.

In addition, different search engines search through their index in different ways and are optimized using different query structures. Some search engines are optimized to accept free-text queries. Others are optimized to accept queries with logical operators such as "AND" and "OR".

The differences between various search engines are largely unknown by average computer users. Therefore, they are not able to determine which search engine would best suit their searching goals. In addition, many of the specialized search engines that index specific categories of pages are unknown to average computer users. Therefore, users are not fully utilizing the variety of search engines available on the Internet.

Currently, there are no tools available to help computer users identify which search engines they should be using to optimize their search.

SUMMARY OF THE INVENTION

A method of aiding a user in searching a computer environment includes retrieving a search query from a user, accessing a user profile and selecting a search area based on the search query and the user profile.

In other embodiments of the present invention, a method provides for receiving a search query, categorizing at least one term in the search query based on an indexed list of terms derived from pages on a network, and identifying at least one search area based at least in part on the category of a search term. In still further embodiments, the search area is selected based on a combination of the user profile and the category of the search term.

Other aspects of the present invention include identifying the scope of a search based on a search query retrieved from a user and using the scope to identify a search area. The scope relates to the level of detail that the user wants the returned documents to provide. The scope is identified in a number of different ways. In one embodiment, the scope is identified based on the number of words in the search query. In other embodiments, the scope is determined by comparing the search query against a user profile. In still other embodiments, the number of terms and the user profile are combined to identify the search scope.

An embodiment of the present invention also provides a method that categorizes search tools based on their ability to search using search queries of selected formats. The method then sends a search query to a search tool based on the search query's format and the category of the search tool.

BRIEF DESCRIPTION OF THE DRAWINGS

FIG. 7B is an alternative example display produced by the present invention when a user wants to enter a new search.

FIG. 24 is an example web companion display produced in response to a search query directed toward a city.

FIG. 25 is an example web companion display produced in response to a search query directed toward a restaurant.

FIG. 28 is an example web companion display produced in response to a search query having a narrow scope.

FIG. 29 is an example web companion display produced in response to a search query having a broad scope.

FIG. 31 is an example of a search query with an ambiguity as to time.

FIG. 32 is an example of a web companion display produced to remove an ambiguity related to time.

FIG. 33 is an example of a search query with an exclusion ambiguity.

FIG. 34 is an example of a web companion display produced to remove an exclusion ambiguity.

FIG. 35 is an example of a search query with a coordinating structure ambiguity.

FIG. 36 is an example of a web companion display produced to remove a coordination structure ambiguity.

DETAILED DESCRIPTION OF ILLUSTRATIVE EMBODIMENTS

Figure 1:
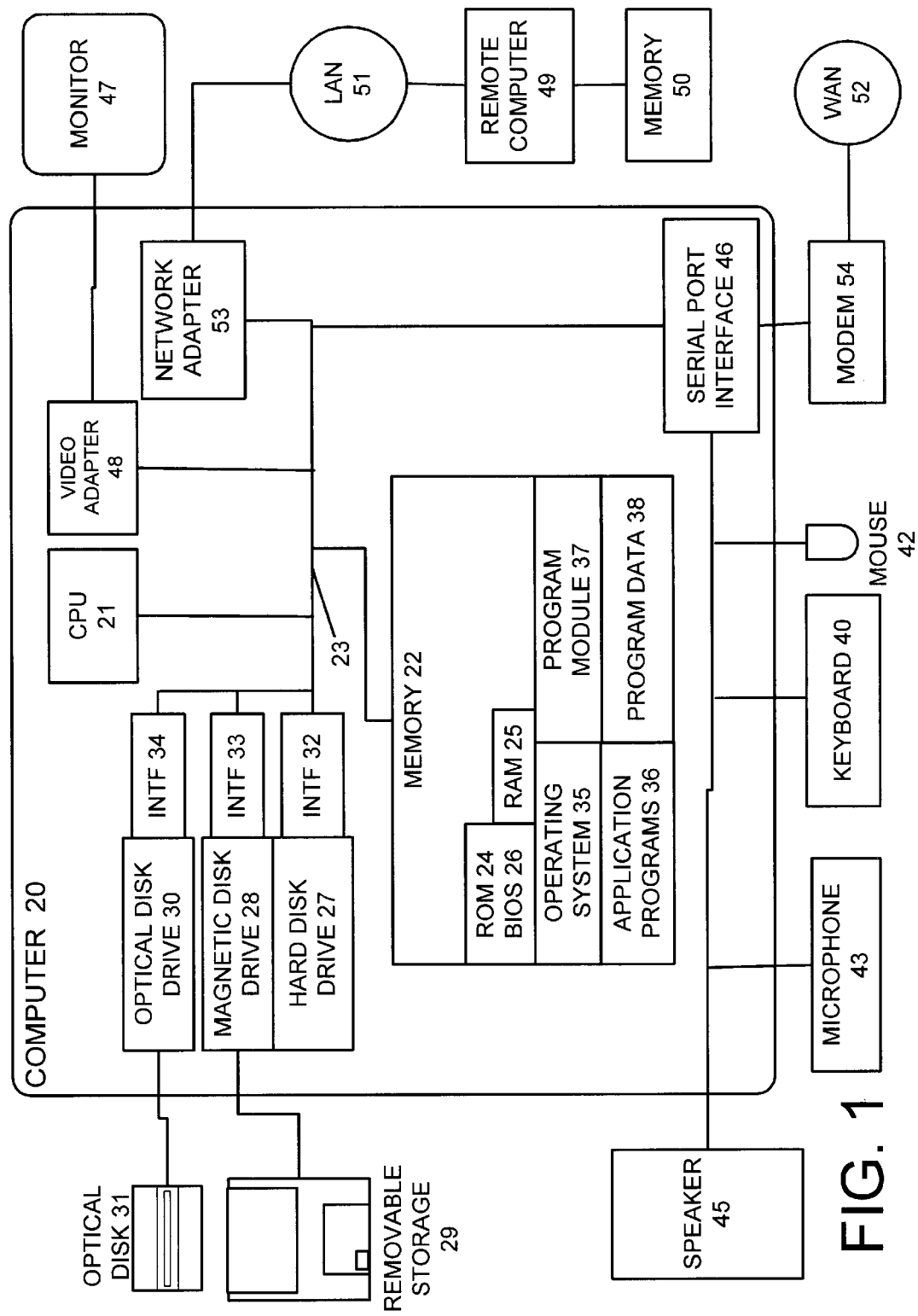
FIG. 1 is a plan view of a computing environment of the present invention.

FIG. 1 and the related discussion are intended to provide a brief, general description of a suitable computing environment in which the invention may be implemented. Although not required, the invention will be described, at least in part, in the general context of computer-executable instructions, such as program modules, being executed by a personal computer. Generally, program modules include routine programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20, including a processing unit (CPU) 21, a system memory 22, and a system bus 23 that couples various system components including the system memory 22 to the processing unit 21. The system bus 23 may be any of several types of bus structures including a memory bus or memory controller, a peripheral bus, and a local bus using any of a variety of bus architectures. The system memory 22 includes read only memory (ROM) 24 and random access memory (RAM) 25. A basic input/output (BIOS) 26, containing the basic routine that helps to transfer information between elements within the personal computer 20, such as during start-up, is stored in ROM 24. The personal computer 20 further includes a hard disk drive 27 for reading from and writing to a hard disk (not shown), a magnetic disk drive 28 for reading from or writing to removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, magnetic disk drive interface 33, and an optical drive interface 34, respectively. The drives and the associated computer-readable media provide nonvolatile storage of computer readable instructions, data structures, program modules and other data for the personal computer 20.

Although the exemplary environment described herein employs the hard disk, the removable magnetic disk 29 and the removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMS), read only memory (ROM), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through local input devices such as a keyboard 40, pointing device 42 and a microphone 43. Other input devices (not shown) may include a joystick, game pad, satellite dish, scanner, or the like. These and other input devices are often connected to the processing unit 21 through a serial port interface 46 that is coupled to the system bus 23, but may be connected by other interfaces, such as a sound card, a parallel port, a game port or a universal serial bus (USB). A monitor 47 or other type of display device is also connected to the system bus 23 via an interface, such as a video adapter 48. In addition to the monitor 47, personal computers may typically include other peripheral output devices, such as a speaker 45 and printers (not shown).

The personal computer 20 may operate in a networked environment using logic connections to one or more remote computers, such as a remote computer 49. The remote computer 49 may be another personal computer, a hand-held device, a server, a router, a network PC, a peer device or other network node, and typically includes many or all of the elements described above relative to the personal computer 20, although only a memory storage device 50 has been illustrated in FIG. 1. The logic connections depicted in FIG. 1 include a local area network (LAN) 51 and a wide area network (WAN) 52. Such networking environments are commonplace in offices, enterprise-wide computer network Intranets, and the Internet.

When used in a LAN networking environment, the personal computer 20 is connected to the local area network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a network environment, program modules depicted relative to the personal computer 20, or portions thereof, may be stored in the remote memory storage devices. It will be appreciated that the network connections shown are exemplary and other means of establishing a communications link between the computers may be used. For example, a wireless communication link may be established between one or more portions of the network.

The present invention provides a web companion that acts as an interactive searching aid for searching a computer environment, especially an environment that includes an Intranet or the Internet. The web companion is interactive in the sense that it provides the user with searching options based on the search query provided by the user and previous searching options the user has selected. Some of the options provided by the web companion are possible search goals that the user may have, such as a person's e-mail address, or photographs of a celebrity. If the user selects one of the goals, the web companion can automatically select an appropriate search area and/or adjust the user's search query to improve the likelihood that the user will find what they are looking for.

The web companion may be invoked in a number of different ways. In a Windows 95®, Windows 98® or Windows NT® based operating system provided by Microsoft Corporation, the web companion can be invoked by "double-clicking" on an icon appearing in the environment. In addition, the web companion can be invoked from within a browser such as Internet Explorer 4 (IE4) from Microsoft Corporation. In particular, the web companion can be registered with IE4 so that IE4 opens the web companion in the background when IE4 is opened. In such a configuration, the web companion does not display an interface while it is operating in the background. When the user enters a search in IE4, either through a search engine on the Internet or through the browser's search screen, the search is provided to the web companion. The web companion then processes the search through steps described below and determines possible suggestions that would aid the user. In some embodiments, the web companion then generates an interface to display the suggestions to the user as described below. In other embodiments, the web companion only displays an interface if the suggestions have a high probability of being helpful to the user. When the web companion is invoked through IE4 in this manner, the web companion display disappears if the user does not adopt a suggestion made by the web companion. The web companion may also be stored on a remote server and invoked through a network connection to the remote server.

Figure 2:
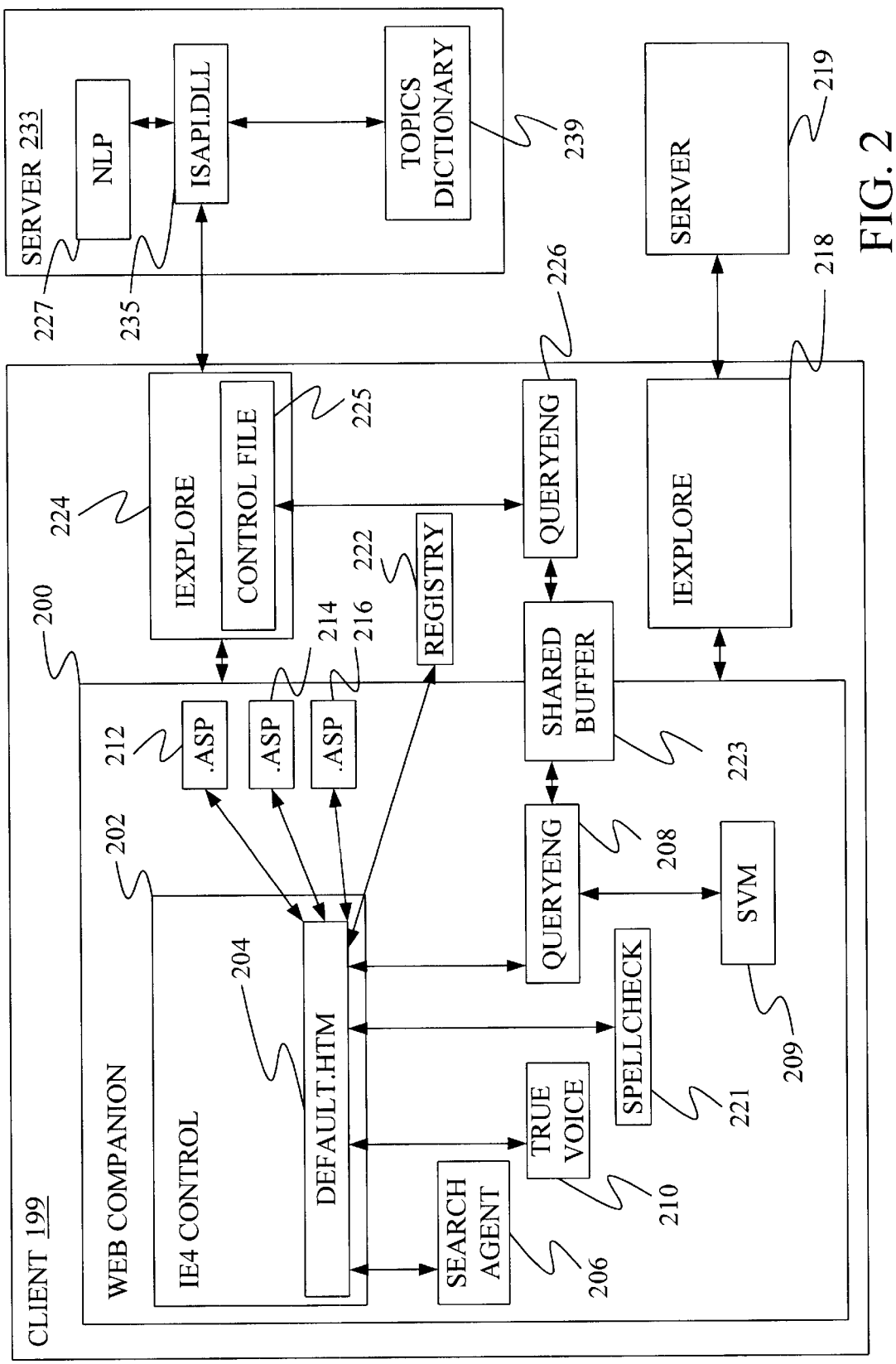
FIG. 2 is a block diagram of an architecture of an embodiment of the present invention.

FIG. 2 shows a component architecture for the present invention. The web companion is initiated by calling an executable application identified as WEB COMPANION 200 in FIG. 2. WEB COMPANION 200 invokes an instance of IE4 control 202, which is an extendable hypertext markup language (html) interpreter produced by Microsoft Corporation. WEB COMPANION 200 also passes a .htm page denoted as DEFAULT.HTM 204 to IE4 control 202, thereby causing IE4 control 202 to execute the instructions in DEFAULT.HTM 204.

The instructions in DEFAULT.HTM 204 include requests for instances of three ACTIVE-X controls: SEARCH-AGENT 206, QUERYENG 208, and TRUEVOICE 210. Each ACTIVE-X control includes methods that can be invoked by DEFAULT.HTM 204 and each ACTIVE-X control is able to fire events that are trapped by DEFAULT.HTM 204.

QUERYENG 208 cooperates with DEFAULT.HTM 204 and WEB COMPANION 200 to perform most of the functions of the present invention. SEARCH-AGENT 206 generates, positions and animates a graphical character, shown as character 262 in FIG. 4B, based on method calls from DEFAULT.HTM 204. SEARCH-AGENT 206 also allows the user to move the animated character using an input device. When the animated character is moved by the user, SEARCH-AGENT 206 fires an event indicating the new position of the character, which is trapped by DEFAULT.HTM 204.

TRUEVOICE 210 produces sounds based on method calls made by DEFAULT.HTM 204. Typically, these sounds are timed to coincide with the animation of the character produced by SEARCH-AGENT 206.

Figure 4B:
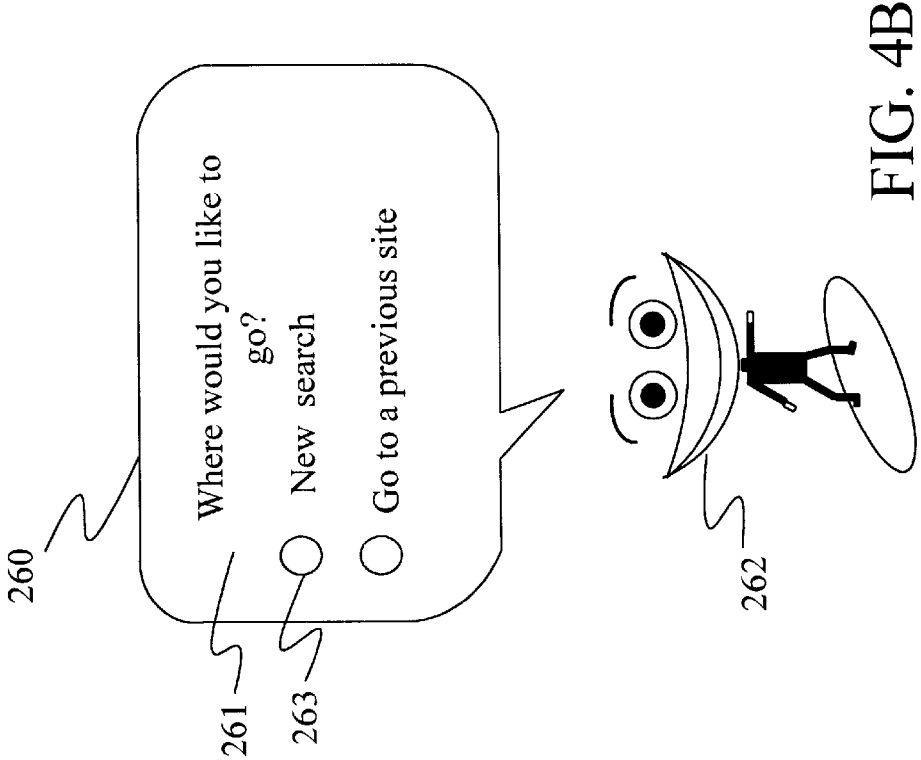
FIG. 4B is an example of an additional display produced by an embodiment of the present invention.

WEB COMPANION 200 generates a balloon, such as balloon 260 of FIG. 4B. The balloon is positioned on the screen based on the location of the animated character, which is provided to WEB COMPANION 200 by QUERYENG 208. Based on instructions in DEFAULT.HTM 204 or alternatively, instructions in Active Server Pages (.ASP) called by DEFAULT.HTM 204, IE4 control 202 displays text and control buttons in the balloon. An example of text displayed by IE4 control 202 is shown in FIG. 4B as text 261 along with an example of a control button 263. Control button 263 may be activated by the user by positioning the cursor over the button and pressing an input device button.

The Active Server Pages called by DEFAULT.HTM include HTML instructions. Although only three ASP files 212, 214 and 216 are shown in FIG. 2, those skilled in the art will recognize that any number of .ASP files may be used in conjunction with DEFAULT.HTM 204.

Figure 3:
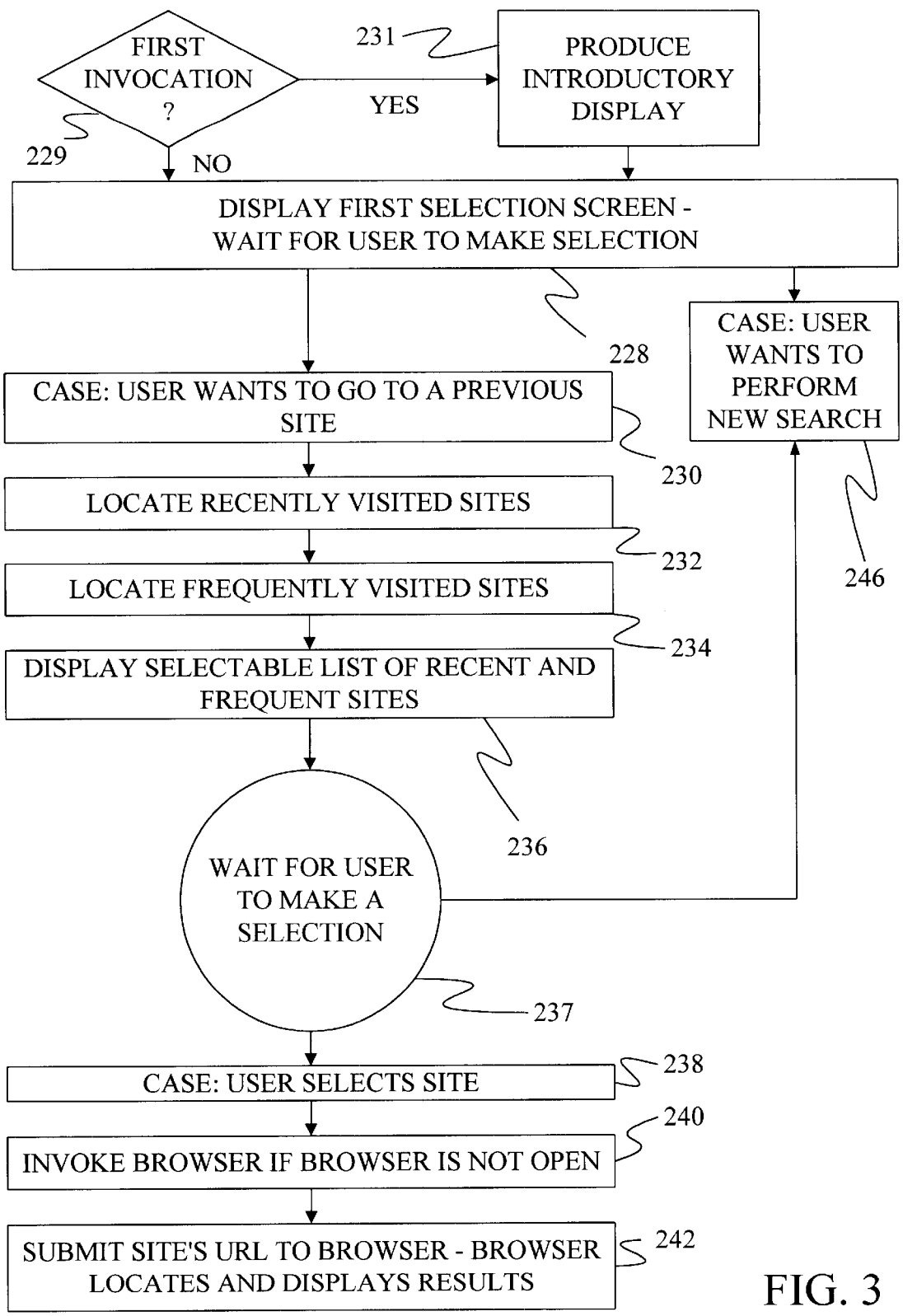
FIG. 3 is a flow diagram describing the initial processes of an embodiment of the present invention.
Figure 4A:
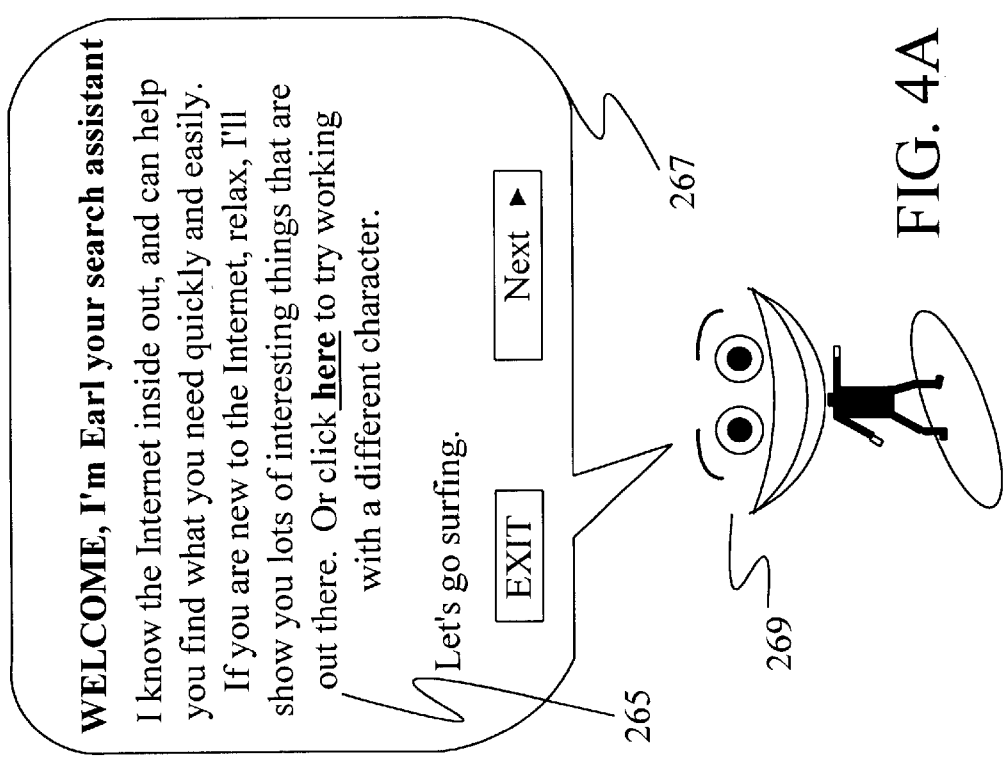
FIG. 4A is an example of an initial display produced by an embodiment of the present invention.

FIG. 3 is a flow diagram of the steps followed by the computer-executable instructions found in WEB COMPANION 200, IE4 control 202, DEFAULT.HTM 204, SEARCH-AGENT 206, and QUERYENG 208. In an initial step 229, DEFAULT.HTM determines if this is the first time WEB COMPANION 200 has been invoked by this user. If it is the first invocation by this user, an introductory interface is provided at step 231 as shown in FIG. 4A. In FIG. 4A, IE4 control 202 displays introductory text 265, produced by DEFAULT.HTM 204, in a balloon 267 produced by WEB COMAPANION 200. At the same time, SEARCH-AGENT 206 displays an animated character 269 next to the introductory balloon.

If this is not the first invocation of WEB COMPANION 200, or after the display of the initial screen, the process continues at step 228 where a first selection display is produced by WEB COMPANION 200, DEFAULT.HTM 204 AND SEARCH-AGENT 206. An example of this display is shown in FIG. 4B with a character 262 produced by SEARCH-AGENT 206 shown next to a balloon 260 produced by WEB COMPANION 200 that contains text 261 and control buttons 263 produced by DEFAULT.HTM 204 and IE4 control 202. In the selection display of FIG. 4B, the user may either choose to perform a new search or go to a previously visited site. Thus, depending on what the user selects, the process either continues at step 230 OR 246.

If the user chooses to go to a previous site, the computer-executable instructions follow step 230 to step 232, where they locate recently visited sites stored for this user. In one embodiment, the recently visited sites are stored in Registry 222 of FIG. 2, which is a memory location maintained by many of the operating systems produced by Microsoft Corporation. However, the recently visited sites may be stored in any suitable memory location on the local machine or a server. After locating the names of recently visited sites, the computer-executable instructions proceed to step 234, where the instructions locate the names of sites that the user frequently visits. In one embodiment, these sites are also stored in Registry 222.

Figure 5:
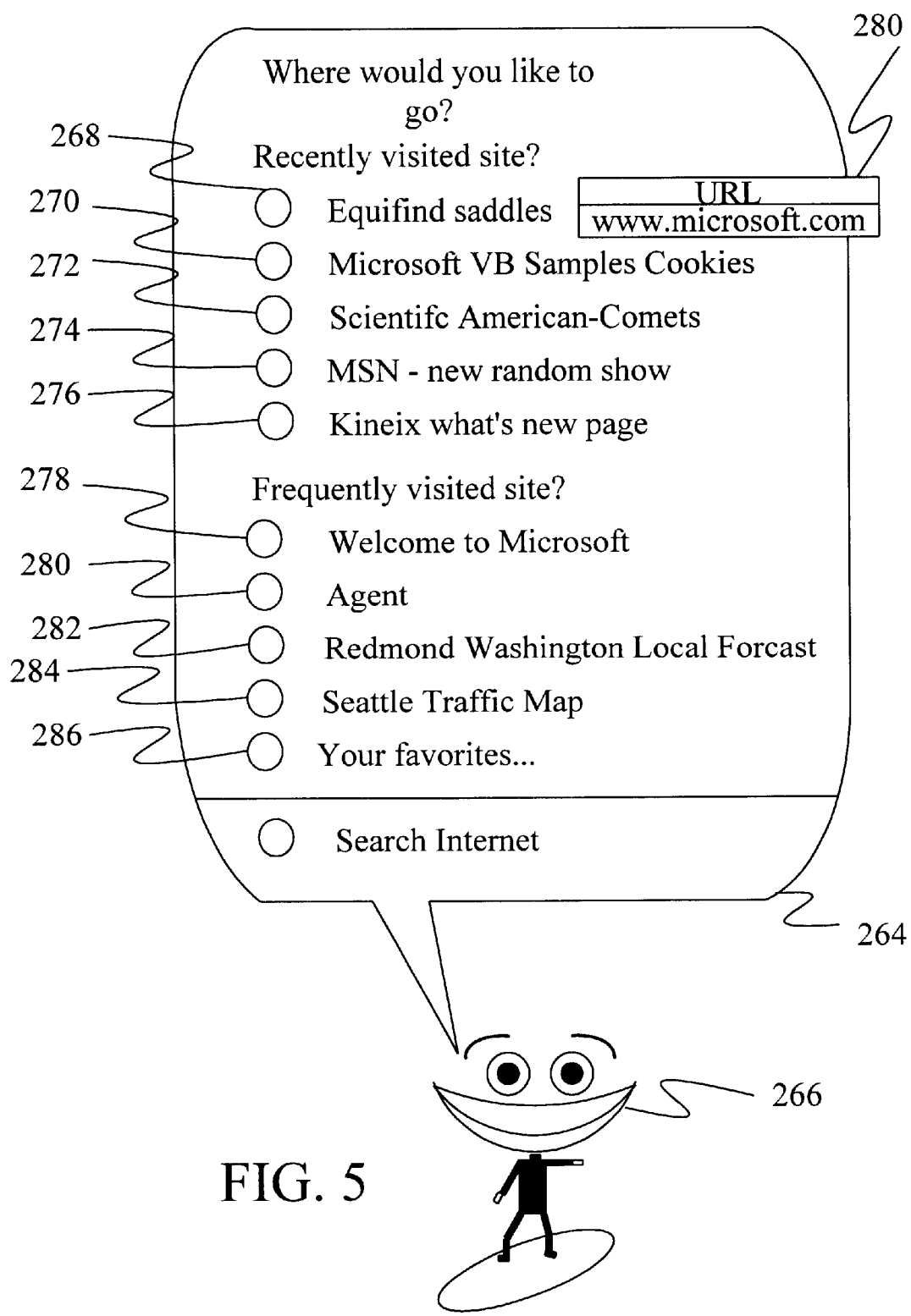
FIG. 5 is an example display produced by the present invention if a user wishes to go to a previous site.

At step 236, DEFAULT.HTM 204 causes IE4 control 202 to display a selectable list of recently visited sites and frequently visited sites. An example of such a selectable list is shown in FIG. 5 in balloon 264. The selectable list is accompanied by animated character 266, which is produced by SEARCH-AGENT 206.

The selectable list of balloon 264 includes selectable entries for five recently visited sites 268, 270, 272, 274, and 276, and selectable entries for five frequently visited sites 278, 280, 282, 284, and 286. The selectable list also includes an option to search the Internet. In many embodiments, the names of the sites that appear in balloon 264 are the common names for the sites. In other words, the Uniform Resource Locators (URLs) for the sites normally do not appear in balloon 264, since most users find it difficult to associate a site's URL with its contents. However, to accommodate users that want to see a site's URL, the present invention provides a pop-up window that appears if the user pauses the display caret over a site's name. An example of this is shown in FIG. 5, where URL window 280 has opened for entry 270. In FIG. 5, the caret is not shown so that entry 270 is not obscured.

While the selectable list of balloon 264 is displayed, DEFAULT.HTM 204 waits for the user to select one of the listed sites in a step 237. If the user selects a site, the computer-executable instructions follow step 238 to step 240.

In step 240, DEFAULT.HTM 204 calls a method in QUERYENG 208 to pass a message to WEB COMPANION 200, asking WEB COMPANION 200 to locate or instantiate an Internet browser such as IEXPLORE from Microsoft Corporation. If one or more Internet browsers are open, WEB COMPANION 200 selects the top browser. If there are no open browsers, WEB COMPANION 200 opens a browser. In FIG.2, the opened browser is shown as IEXPLORE 218. DEFAULT.HTM 204 passes the URL of the selected site through QUERYENG 208 and WEB COMPANION 200 to IEXPLORE 218 at step 242.

IEXPLORE 218 uses the site's URL to locate the site's server over a network connection, such as the Internet, and to make a request from the server for the site's content. The located server, shown as server 219 in FIG. 2, returns the requested content to IEXPLORE 218. As those skilled in the art will recognize, the returned content can take many forms. IEXPLORE 218 determines the form of the content it receives from server 219 and displays the content in a browser window. IEXPLORE 218 remains open until the user closes the browser window. This allows the user to perform further Internet searching and viewing operations through the browser. Such operations are separate and independent of the operation of the web companion.

Figure 6:
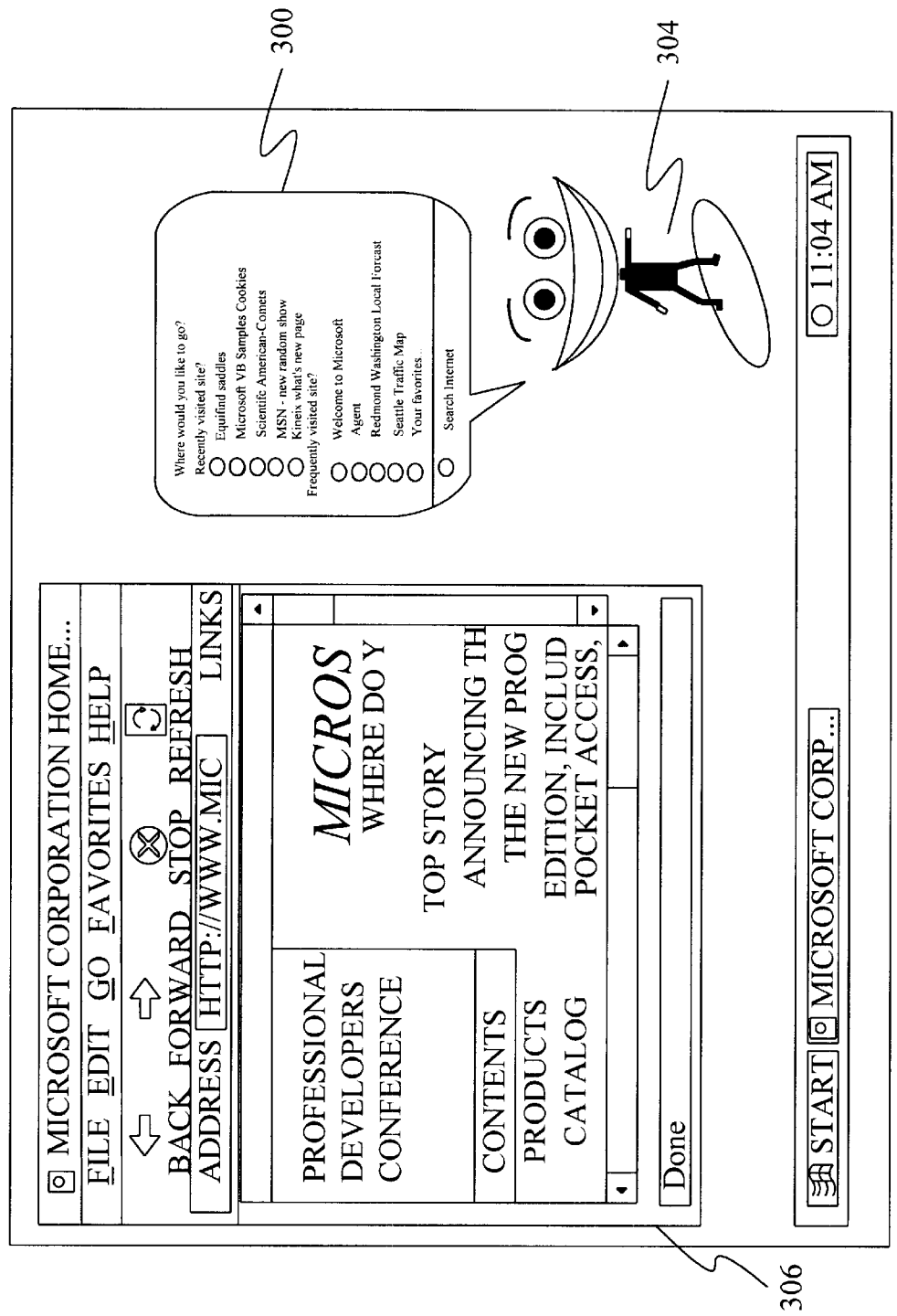
FIG. 6 is an example text display with an animated character in accordance with an aspect of the present invention shown in conjunction with an Internet browser window.

FIG. 6 presents a screen display where a web companion balloon 300 and a character 304 appear on the same screen as an Internet browser window 306 created through the steps described above. Browser window 306 is independent of balloon 300 and character 304 and may be moved, expanded, closed, and have its dimensions changed independently of balloon 300 and character 304.

If at steps 228 or 237 of FIG. 3, the user selects to perform a new search, the computer-executable instructions continue at step 246. Step 246 leads to step 320 of an additional flow diagram shown in FIG. 8.

Figure 7A:
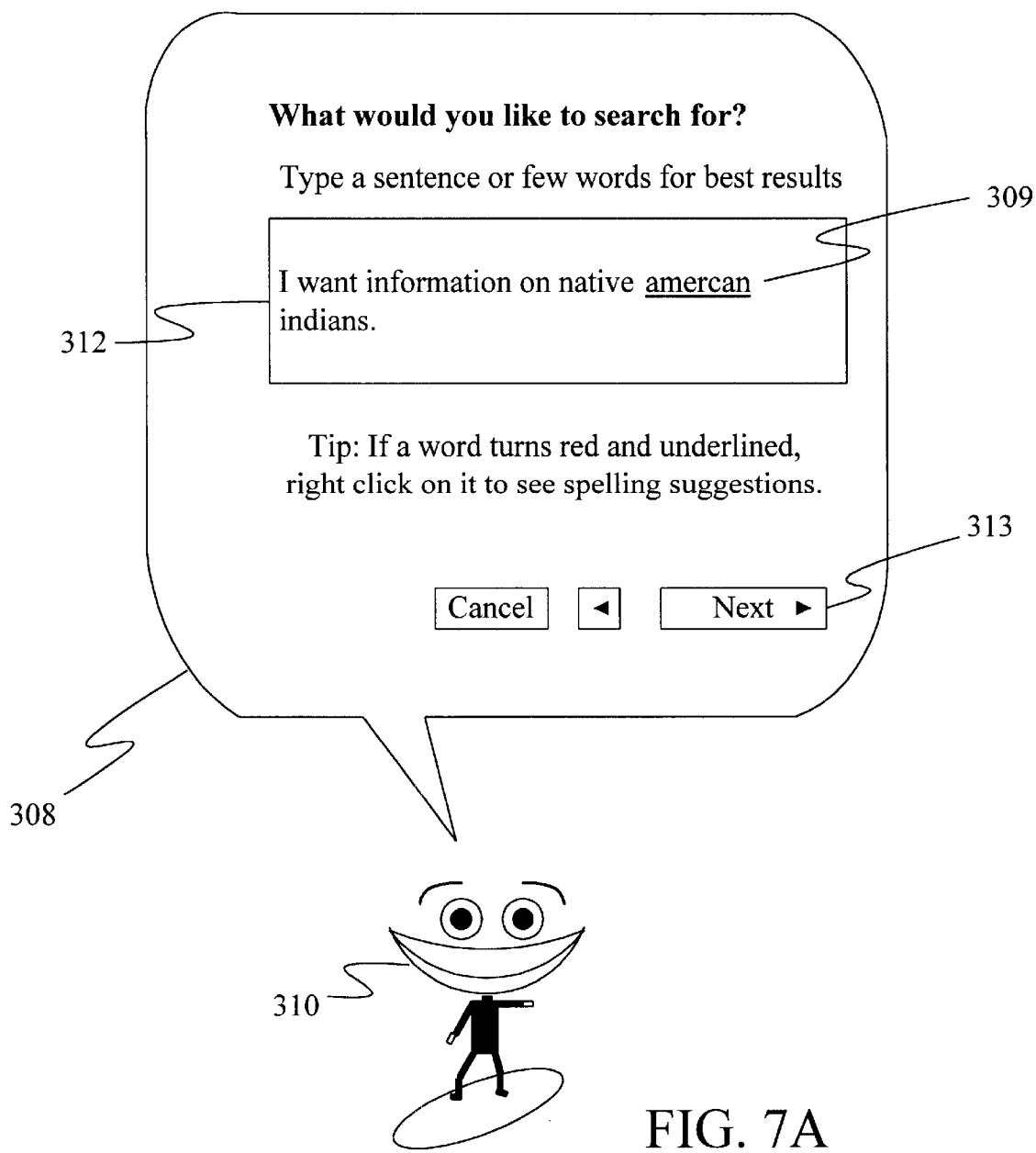
FIG. 7A is an example display produced by the present invention when a user wants to enter a new search.
Figure 8:
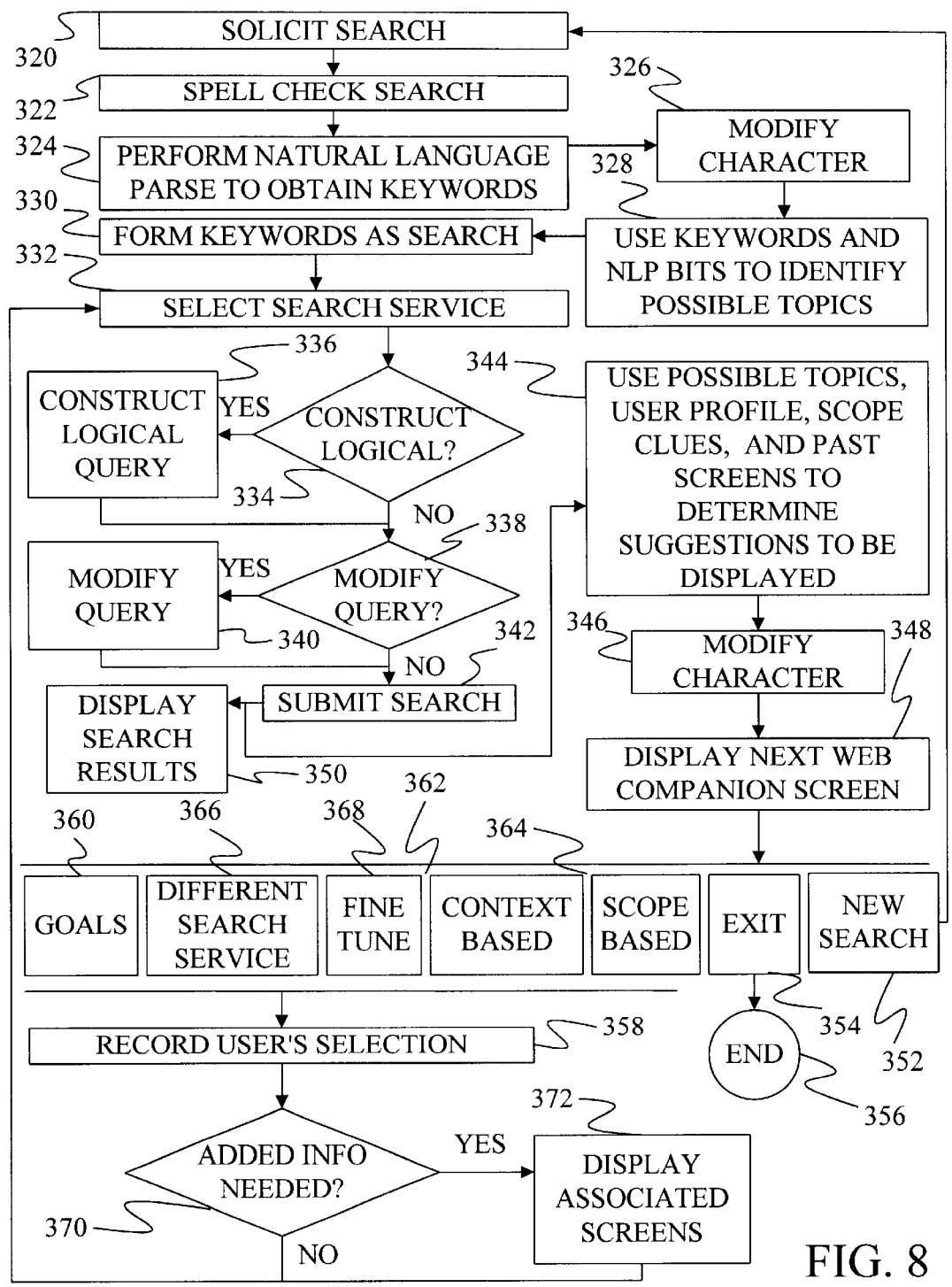
FIG. 8 is a flow diagram of the central process of an embodiment of the present invention.

At step 320 of FIG. 8, DEFAULT.HTM 204 causes IE4 control 202 to display a search interface. An example of such a search interface is shown in FIG. 7A, where the interface appears within a balloon 308 produced by WEB COMPANION 200 that appears adjacent animated character 310 produced by SEARCH-AGENT 206.

In addition to defining the search interface shown in FIG. 7A, DEFAULT.HTM 204 establishes an instance of a spell checking object identified as SPELLCHECK 221 in FIG. 2. DEFAULT.HTM 204 assigns a text box 312 in balloon 308 to SPELLCHECK 221 so that text entries and cursor movements within text box 312 are passed directly to SPELLCHECK 221. This allows SPELLCHECK 221 to verify the spelling of words as they are entered by the user and to suggest alternative spellings when the user places the cursor over a word and activates a button on their mouse or track-ball.

The search interface found in balloon 308 of FIG. 7A includes a solicitation to the user to type in their search request in a natural language or free text format. In these formats, the user simply enters normal statements or questions and does not need to include logical operators to indicate the relationship between the terms of the search query. Text box 312 displays the user's search query as the user types and allows the user to modify their query. This search solicitation process is represented by step 320 of FIG. 8.

FIG. 7B provides an alternative search solicitation display to that shown in FIG. 7A. In FIG. 7B, a pull-down text box 250 is provided to accept and display the user's search text. Pull-down text box 250, includes a pull-down activation arrow 251 that causes a pull-down window 252 to be displayed when activated. Pull-down window 252 displays a selectable list of past search queries entered by the user and allows the user to select a past search query by highlighting it. Typically, past search queries are stored in Registry 222 of FIG. 2. However, they may be stored in any suitable memory location.

By recording the user's past searches and by allowing the user to review their past searches, the present invention improves searching efficiency by reducing the likelihood that the user will unknowingly reuse unsuccessful searches or waste time trying to remember past successful searches.

Figure 7C:
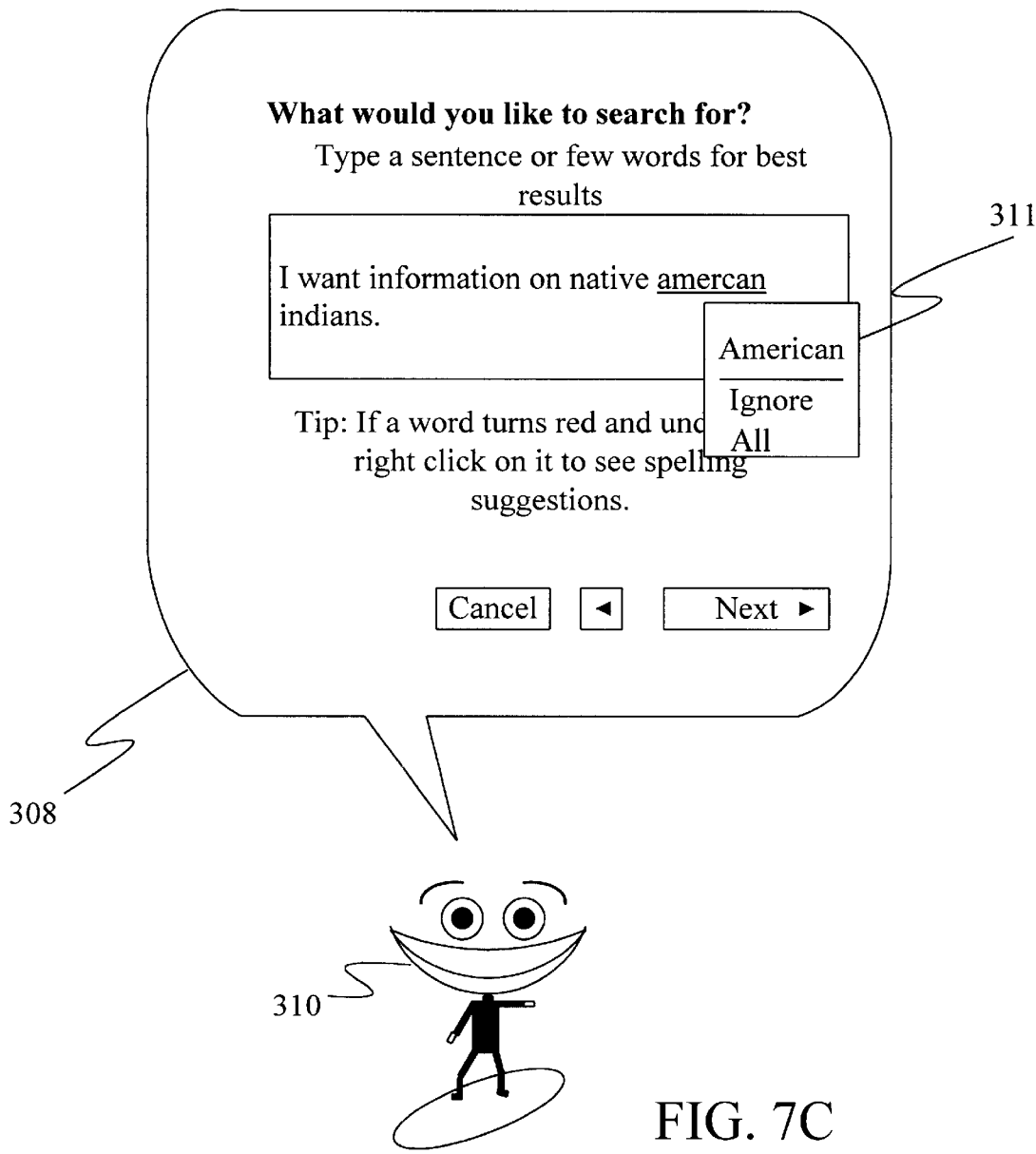
FIG. 7C is an example display produced by the present invention showing spell-checking options provided by an embodiment of the present invention.

While the user is entering their search query, the query is spell checked by SPELLCHECK 221 at a step 322 of FIG. 8. If the search query includes a misspelled word, SPELLCHECK 221 provides a visual cue to the user that a word is misspelled. In many embodiments, this visual cue is a red line underneath the misspelled word. FIG. 7A shows an example of a visual cue 309 beneath the misspelled word "amercan". In further embodiments, SPELLCHECK 221 displays a list of properly spelled words when the user activates a button on their input device. An example of such a display is shown in FIG. 7C where a selectable list 311 is displayed by SPELLCHECK 221 in response to a button being activated on an input device while the cursor is positioned over the word "amercan". If the user selects one of the properly spelled words, SPELLCHECK 221 automatically replaces the misspelled word with the selected word.

Once the user has finished entering and modifying their query, they activate NEXT button 313 of FIG. 7A or NEXT button 253 of FIG. 7B, which causes the instructions of DEFAULT.HTM 204 to request the query text from SPELLCHECK 221 and to initiate processing of the query text. Such processing begins at step 324 of FIG. 8, where the web companion performs a natural language parse (NLP) of the query text. The steps taken to perform the natural language parse are shown in detail in the flow diagram of FIG. 9.

Figure 9:
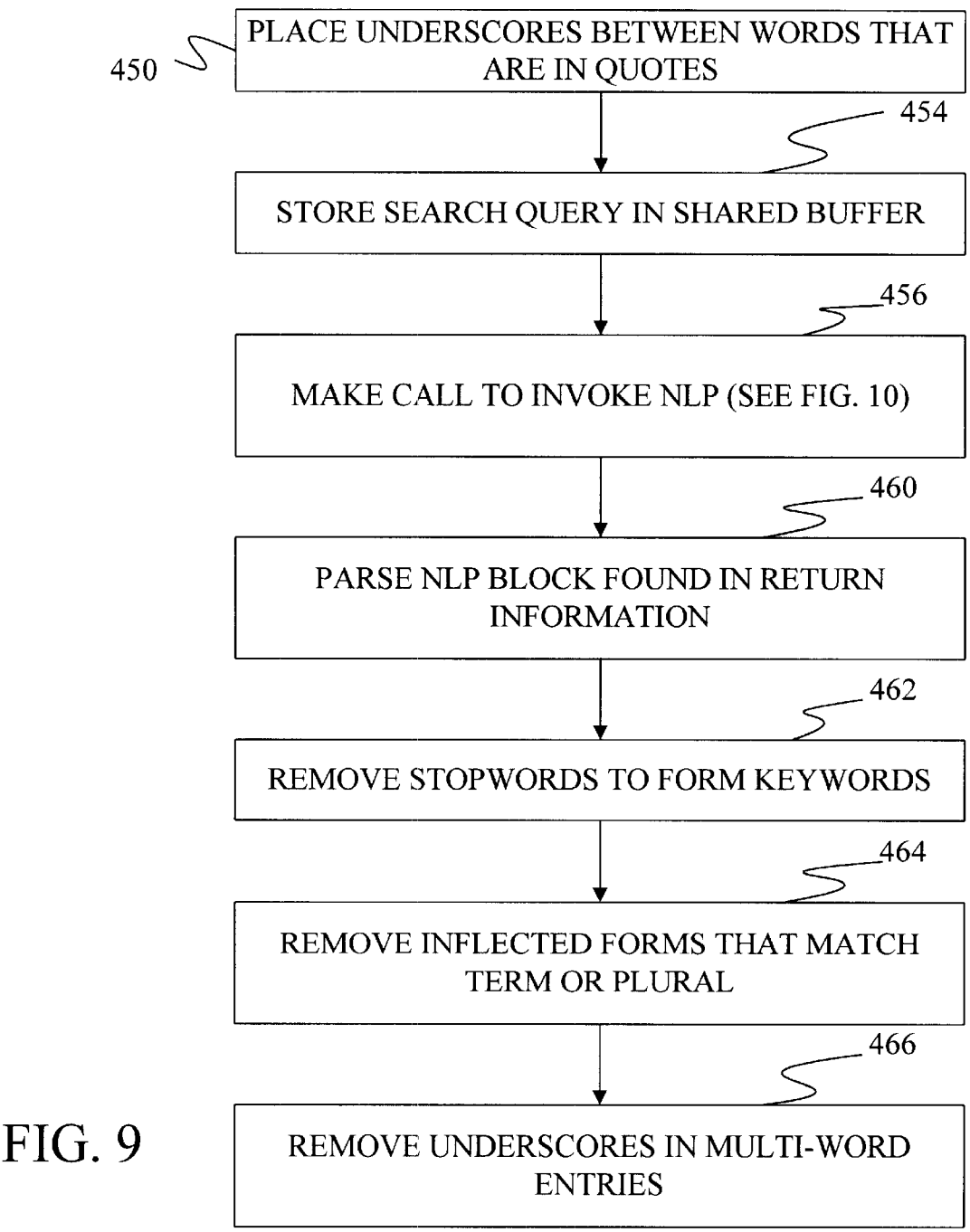
FIG. 9 is a flow diagram showing a process for performing a natural language parse under an embodiment of the present invention.

The NLP process of FIG. 9 begins at step 450, where QUERYENG 208 of FIG. 2 replaces the spaces between words found in quotes in the user's query with underscores. At step 454, the search query is stored in a shared buffer 223 of FIG. 2. QUERYENG 208 then makes a call to invoke the NLP component at a step 456.

Figure 10:
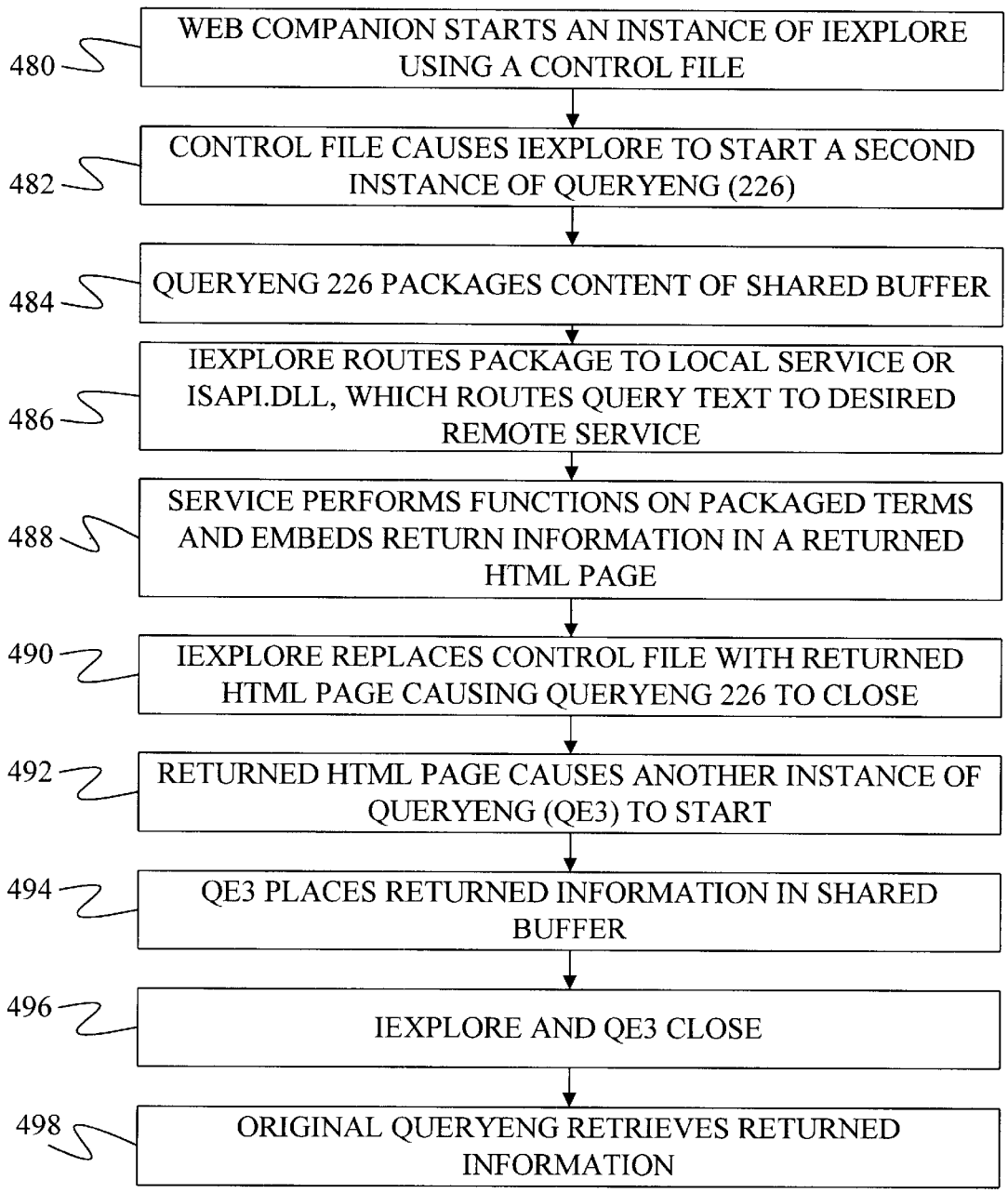
FIG. 10 is a flow diagram for making a remote call to an object located on a remote server under an embodiment of the present invention.

The steps required to make the call to invoke the NLP component are shown in the flow diagram of FIG. 10. The steps of FIG. 10 begin at step 480 where, as shown in FIG. 2, WEB COMPANION 200 starts an instance of IEXPLORE 224. WEB COMPANION 200 also passes a control file 225 to IEXPLORE 224. In step 482, control file 225 causes IEXPLORE 224 to start a second instance of QUERYENG denoted as QUERYENG 226 in FIG. 2. QUERYENG 226 retrieves the search query stored in shared buffer 223 and packages the query to send it to the NLP component.

In step 486 of FIG. 10, IEXPLORE 224 routes the package created by QUERYENG 226 to the NLP component. If the NLP component is on client 199, the package is routed directly to the component. If the NLP component is located on a remote server, the package is routed to an Internet Server Application Programming Interface (ISAPI.DLL). The ISAPI.DLL then routes the package to the NLP component. In the embodiment of FIG. 2, NLP component 227 is located on a remote server 233, so the package is routed to an ISAPI.DLL 235, which routes it to NLP component 227. For clarity in the discussion below, NLP component 227 is used to describe the functions of the NLP component. However, it should be recognized that these functions are not dependent on the location of the NLP component and an NLP component with the same capabilities may alternatively be located on the client under the present invention.

In step 488, the NLP component 227 performs natural language parsing functions on the search query. NLP component 227 uses known logical and syntactic rules to identify respective parts of speech for each term in the search query. NLP component 227 also identifies words that modify other terms in the search query and how words modify each other. In addition, NLP component 227 reduces each term in the search query to its most basic form and creates inflected and plural forms from the most basic form. NLP component 227 is also able to identify the semantics of certain words and categorize them. For instance, NLP component 227 is capable of recognizing that the term "recent" is related to time. Other categories include city, state, country, continent, and proper name, etc NLP component 227 can also group together multiple words that represent a single conceptual item. For instance, NLP is able to identify the constituent parts of a date as belonging to a single date construct. To identify these "multi-word entries", NLP component 227 utilizes "factoids" and "captoids". Factoids are rules that identify multi-word entries on the basis of known facts. For example, NLP component 227 identifies "New Jersey" as a single multi-word entry because of the fact that New Jersey is a state. Captoids are rules that identify multi-word entries on the basis of the capitalization of terms in the query. For instance, if "Jack's Seafood Restaurant" is found in a search query, NLP component 227 will identify it as a multi-word entry on the basis of its capitalization.

NLP component 227 returns a block of NLP data embedded in an HTML page that is routed back to IEXPLORE 224. This is shown in FIG. 10 as step 488. At step 490, IEXPLORE 224 replaces control file 225 with the HTML page returned by NLP component 227. This causes QUERYENG 226 to close. At step 492, the returned HTML page causes another instance of QUERYENG (QE3) to start, which at step 494 places the returned NLP block in shared buffer 223. IEXPLORE 224 and QE3 then close at step 496. The final step in making the call to NLP component 227 is step 498 where original QUERYENG 208 retrieves the returned NLP information from shared buffer 223.

Figure 11:
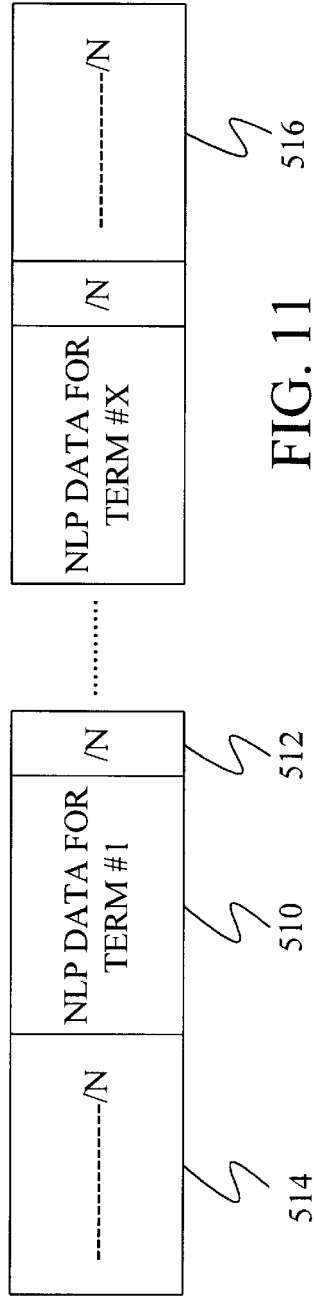
FIG. 11 is a layout for an NLP block produced by a NLP component under an embodiment of the present invention.

After the call to the NLP component the process of FIG. 9 continues at step 460, where the NLP block returned by the NLP component is parsed into its constituent parts. One embodiment of the NLP block structure is shown in FIG. 11, where NLP block 508 includes a data set for each NLP term. For example, NLP data for a first term is found in data set 510, which is followed by a new-line marker (/N) 512. The NLP data for the terms are together positioned between matching markers 514 and 516 that include lines of dashes ("-") that are terminated with new-line markers.

Figure 12:
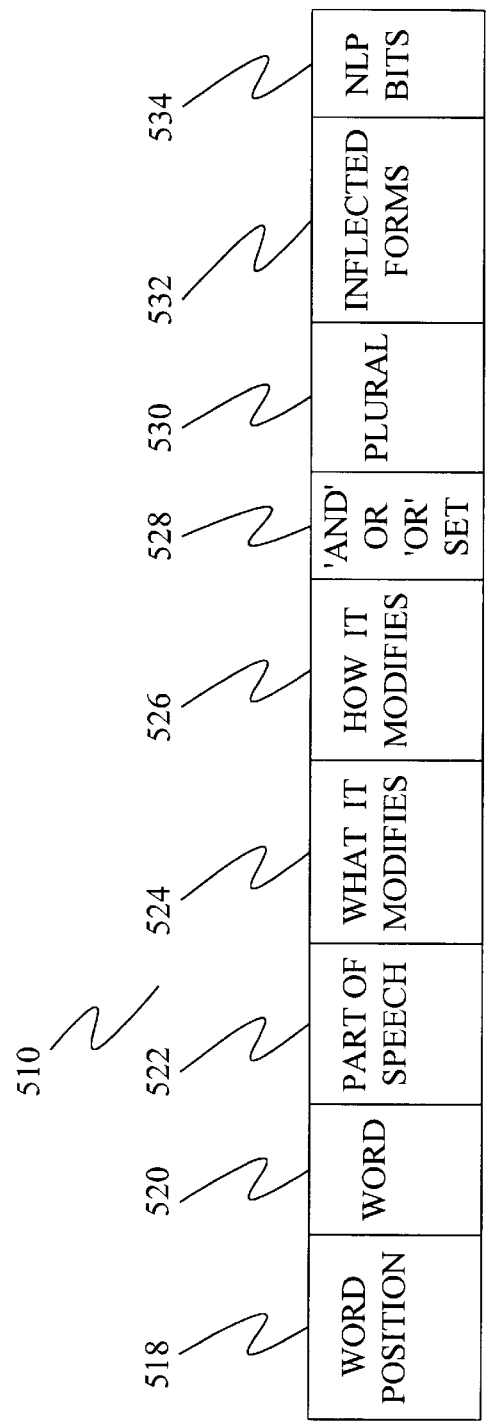
FIG. 12 is an example of a layout for the NLP data of one search term in the NLP block.

The NLP data for each term is normally of the form shown in FIG. 12 for data set 510. Data set 510 includes nine fields: WORD POSITION 518, WORD 520, PART-OF-SPEECH 522, WHAT-IT-MODIFIIES 524, HOW-IT-MODIFIES 526, 'AND' or 'OR' SET 528, PULRAL 530, INFLECTED FORMS 532, and NLP BITS 534. WORD POSITION 518 contains the word's numerical location in the query and is in the form of an integer. WORD 520 and PART-OF-SPEECH 522 provide the word itself and its part-of-speech in the query, respectively. WHAT-IT-MODIFIES 524 indicates the number of any word that the current word modifies in the query and HOW-IT-MODIFIES 526 indicates the manner in which it modifies these other words. Examples of entries in HOW-IT-MODIFIES 526 include noun-adjective (NADJ) relationships where an adjective modifies a noun. It can also include generic modifying relationships such as the case where a noun modifies another noun, rather than an adjective modifying a noun. An example of this would be "Whitewater scandal" or "plant species". 'AND'-or-'OR' SET 528 indicates whether the term is part of a coordinating set based on 'AND' or 'OR'. If the term is not part of such a set, the value in this field will be −1. If the term is part of an 'AND' set, the field will have a value between 0 and 99. If the term is part of an 'OR' set, this field will have a value greater than 100.

PLURAL 530 provides a plural form of the term if appropriate and INFLECTED FORMS 532 provides any inflected forms of the term, separated from each other by commas. NLP BITS 534 provides semantic markers that indicate semantic information about the term. Examples of such markers include: "+tme" for terms related to time, "+city" for terms identifying a city, "+nme" for a person's name, "+neg" for a term providing a negative meaning, "+vulgar" for vulgar terms, and "+food" for terms related to food. The list above is only provided as an example and those skilled in the art will recognize that other markers are possible.

Returning to the flow diagram of FIG. 9, the parsing function of step 460 parses the fields of each term into program variables used by QUERYENG 208 and DEFAULT.HTM 204. When the parse is complete, any parsed words in the WORD field of the NLP block that are "stop words" are deleted to form a set of keywords. "Stop words" include words that occur so frequently in a language that they have no significance in a search query. Examples include articles such as "the" and "a", many prepositions, and common verbs such as "have" and "be". The removal of stop words is shown as step 462 in FIG. 9. In one embodiment, stop words found in quoted phrases in the user's query and stop words that appear in a multi-word entry identified by NLP component 227 are not removed.

At step 464 of FIG. 9, NLP data for each of the terms is checked to see if an inflected form returned by NLP matches the term itself or its plural form. If there is a match, the inflected form is deleted to remove redundancy in the NLP data. At step 466, underscores are removed from between multi-word entries that appear as a single term in the returned NLP block. After step 466 of FIG. 9, step 324 of FIG. 8 is complete and the conversion of the natural language parse data into keywords has been accomplished.

At step 326 of FIG. 8, the keywords formed in step 324 are, if desired, used to modify the behaviors or animations of the character. For instance, in one embodiment of the invention, if one of the keywords is associated with the NLP vulgar bit, the character is changed so that it blushes.

In step 328 of FIG. 8, the original search query, the keywords found in step 324 and their associated NLP bits are used to identify possible search topics. These search topics represent broad categories of information that the search query appears to be directed toward. The process of identifying these categories is shown in greater detail in the flow diagram of FIG. 13.

Figure 13:
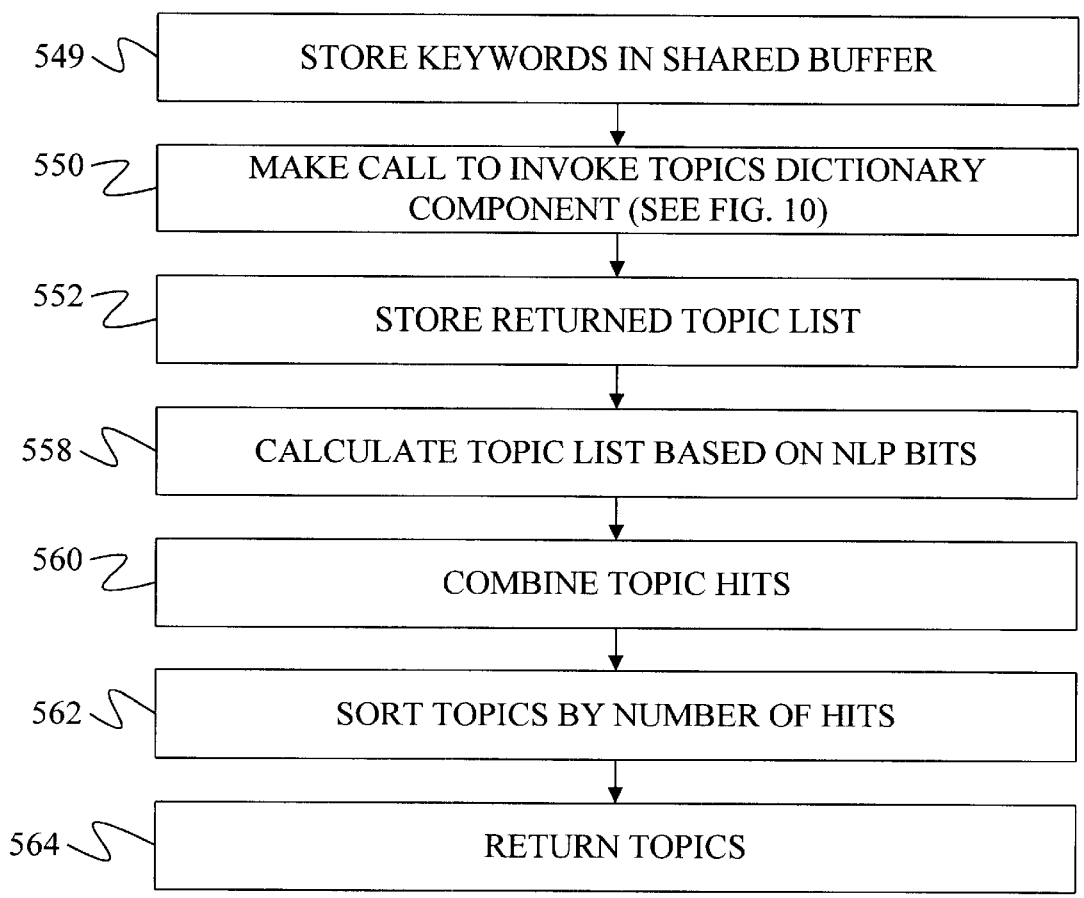
FIG. 13 is a flow diagram of a process for identifying possible topics under an embodiment of the present invention.

In first step 549 of FIG. 13, the keywords obtained in step 324 of FIG. 8 are stored in a shared buffer such as shared buffer 223 of FIG. 2. In one embodiment, phrases that are in quotes in the user's query appear unchanged and remain in quotes in shared buffer 223. A Topics Dictionary component is then called in step 550 using the technique described above for invoking the NLP component. To invoke the Topics Dictionary component using the technique described above, the control file 225 passed to IEXPLORE 224 is modified so that it causes the keywords to be passed to a Topics Dictionary component instead of the NLP component.

In the embodiment of FIG. 2, a Topics Dictionary 239 is shown on server 233. In other alternative embodiments, the Topics Dictionary is located on client 199 or on servers other than server 233. Regardless of its location, Topics Dictionary 239 receives a package of keywords from IEXPLORE 224 and as shown in step 488 of FIG. 10, performs functions on the terms in the package.

Figure 14A:
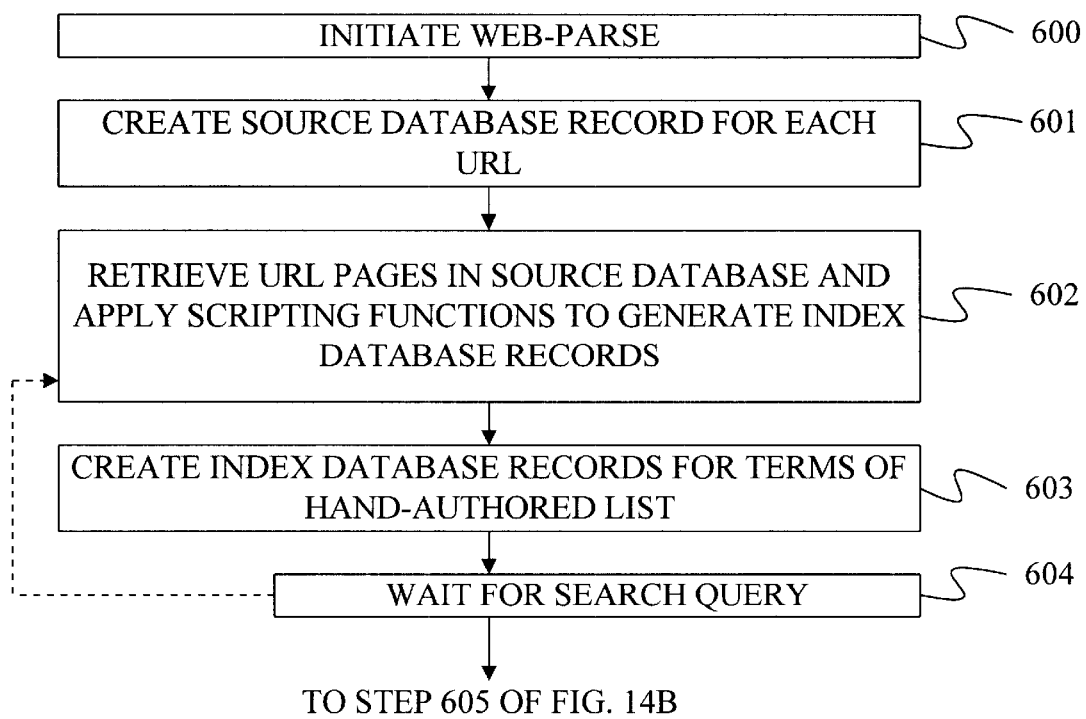
FIGS. 14A and 14B are flow diagrams of a process followed by a Topic Dictionary component under an embodiment of the present invention.
Figure 14B:
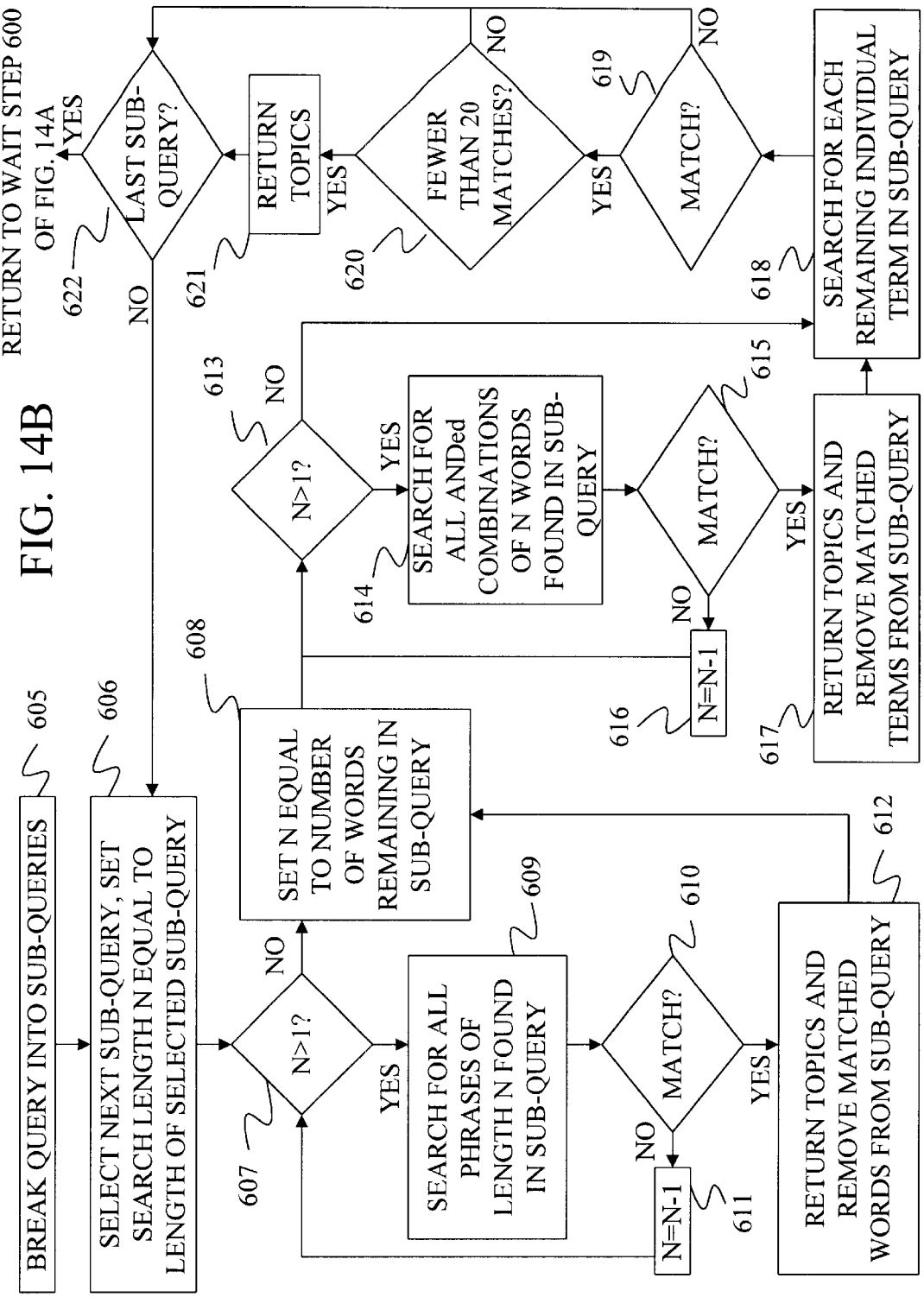
Figure 14C:
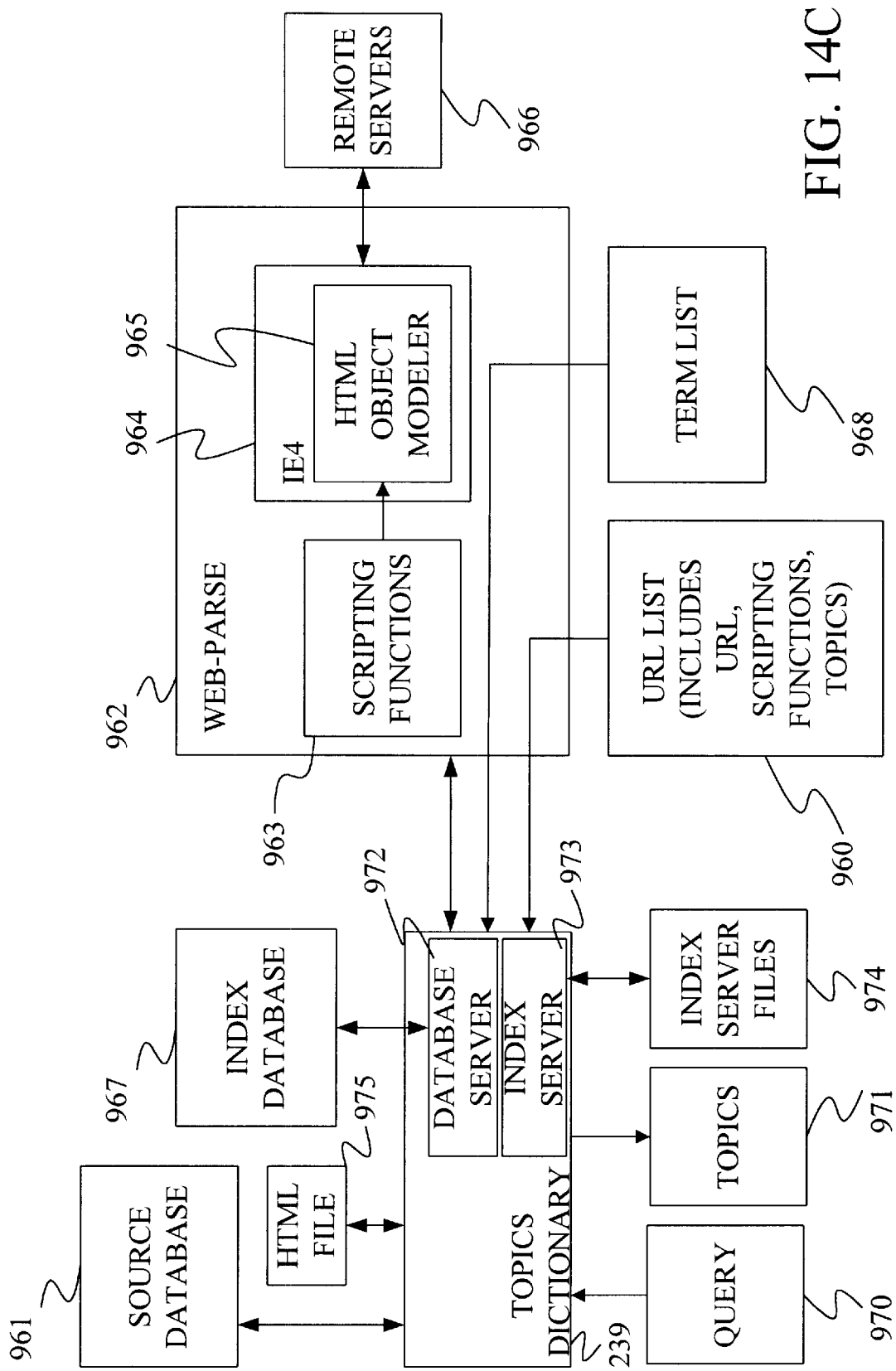
FIG. 14C is a block diagram of components used in connection with the Topic Dictionary component.

The operation of Topics Dictionary component 239 is shown through flow diagrams in FIGS. 14A and 14B and a block diagram in FIG. 14C. The block diagram of FIG. 14C shows the additional components utilized by Topics Dictionary component 239 to identify possible topics based on the keywords of the search text. The flow diagrams describe the process used by Topics Dictionary component 239 to identify the topics.

In an initial step 600 of FIG. 14A, an executable denoted as WEB-PARSE 967 in FIG. 14B, is initiated, which passes a URL list 960 to Topics Dictionary component 239. URL list 960 includes a set of Uniform Resource Locators for pages located on the Internet and/or Intranet. In the list, each URL is associated with one or more topics and with a scripting function discussed further below. In step 601, a database server 972, which forms part of Topics Dictionary 239, uses URL list 960 to generate a source database 961 that represents the associations found in URL list 960.

At step 602, WEB-PARSE 962 uses database server 972 to sequentially access the URL records stored in source database 961. For each URL, WEB-PARSE 962 invokes a browser 964, such as Internet Explorer 4 from Microsoft Corporation. Browser 964 uses the URL to retrieve the URL's page from a remote server 966 and to store the page locally.

Once the page has been retrieved, WEB-PARSE 962 calls scripting functions 963 that are associated with the URL in source database 961. These scripting functions isolate desired information in the URL's page using dynamic object models of the HTML tags on the page. These object models are created by HTML object modeler 965 in response to method calls made by scripting functions 963.

The isolation functions performed by scripting functions 963 strip irrelevant information from a URL's page. Thus, if a page contains a header, some opening text, and a list of celebrity addresses, and the topic associated with the page is celebrity addresses, the scripting functions can isolate the celebrity addresses from the header and the opening text. This is accomplished using the HTML object models, which allow the scripting functions to manipulate the URL's page based on HTML tags in the page. For example, the scripting functions can retrieve all of the text lines associated with <anchors> HTML tags by calling an HTML object method that performs that function.

In most embodiments, the scripting functions treat the text string associated with an individual HTML tag as an individual entry. Thus, if a multi-word text string is associated with an HTML tag, the entire text string is considered one phrase. By storing text strings found on network pages as single units, the present invention improves the precision of the topics it returns. Thus, if "John Glen's Address" appears on a celebrity page and "John's Apple Store" appears on a shopping page, a search query for "John Glen's Address" will only return a hit for the celebrity page and not for the shopping page, even though both pages contain the word "John". If the terms on the pages were stored individually, both pages would produce a hit resulting in an erroneous identification of the topic of the search.

For each entry isolated by scripting functions 963, WEB-PARSE 962 places the entry and its associated topics in index database 967 and/or HTML files 975. The entries that are placed in index database 967 are placed there by making database calls to database server 972 and can be accessed later by making additional calls to database server 972. The entries that are placed in HTML files 975 are placed there by Topics Dictionary 239 so that they may be indexed by an Index server 973 to form Index server files 974. Whether an entry and its associated topics are added to the index database or the Index server files is controlled by a property in URL list 960. The topics for an entry may be any one of or all of the topics listed for this URL page in source database 961.

At step 603, WEB-PARSE 962 passes individual terms found in a term list 968 to Topics Dictionary component 239. Term list 968 includes a list of terms and phrases organized by topics and allows terms to be associated with certain topics in Index database 967 or Index server files 974 even though the terms do not appear in a URL's page. For each term or phrase in term list 968, database server 972 creates an additional entry in Index database 967 and/or Topics Dictionary 239 creates an additional entry in HTML text file 975 to be indexed by Index server 973.

In one embodiment of the invention, all forms of the individual terms (e.g. plural, singular, past tense etc.) either from a URL page or the term list are derived before being stored. This derivation creates all of the linguistic forms of each individual term. For example, if the term "televisions" is found in the URL page, it is stemmed to provide both "television" and "televisions".

Once the isolated entries for each of the URL pages listed in source database 961 have been entered in Index database 967 and/or Index server files 974, the process of FIG. 14A pauses at step 604 to wait for a search query. When a search query 970 is received, the process continues at step 605 of FIG. 14B where Topics Dictionary 239 divides the query into sub-queries. Specifically, each quoted phrase in the user's query and each multi-word entry designated by NLP component 227 are set as separate sub-queries. Once the phrase and multi-word entries have been grouped into sub-queries, the remaining terms in the user's query are grouped as a single sub-query.

Each sub-query found above is sequentially processed through the remaining steps of FIG. 14B. In step 606, one of the sub-queries is selected and the number of terms in the sub-query is used to initialize a search length variable "N". At step 607, N is compared to "1" to determine if there is more than one term in the sub-query. If there is more than one term, Topics Dictionary 239 uses database server 972 and/or Index server 973 to search through Index Database 967 and/or Index server files 974 for the entire sub-query at step 609. If one or more matches are found for the entire sub-query at step 610, the associated topics 971 are returned to IEXPLORE 224 at step 612. In one embodiment, the topics are returned in an HTML page. However, those skilled in the art will recognize that the topic may be returned in any suitable format. If a match cannot be found for the entire sub-query at step 610, the length variable N is reduced by one at step 611 and control returns to step 607. If N is again greater than one at step 607 the length variable N is reduced by one at step 611 and control returns to step 607.

If N is again greater than one at step 607, Topic Dictionary 239 searches for all phrases of length N found in the sub-query. Thus, if the initial query was (A B C D), where A, B, C, and D are each terms, the first reduction in size produces two search units (A B C) and (B C D) that are searched for individually in Index database 967. If either of these smaller units is found Index database 967 and/or Index server files 974 at step 610, the associated topics 971 are returned at step 612 and the terms corresponding to the matching phrases are removed from the sub-query. If both of these smaller units are found in Index database 967 and/or Index server files 974 at step 610, the associated topics 971 for both units are returned at step 612 and all of the terms of the sub-query are removed.

If neither of these smaller units is found in Index database 967 at step 610, the length variable N is again reduced by one at step 611. If N is still greater than one at step 607, Topics Dictionary 609 searches for all phrases of length N found in the search query. Using the example above, this produces three units (A B) (B C) and (C D), which are each searched for in Index database 967.

Steps 607, 609, 610 and 611 are repeated until a query unit is found in Index database 967 or Index server files 974, or until N equals one.

When N equals one at step 607, or after topics have been returned at step 612, the process continues at step 608 where N is reset to equal the number of terms remaining in the sub-query. This number will be less than the number of terms originally in the sub-query if terms were removed in step 612 after a match was found. At step 608, only those terms that did not have a match are left in the sub-query.

At step 613, N is compared to one and if it is greater than one, Topics Dictionary 239 places a Boolean "AND" between each term of the sub-query at step 614. Continuing the example above, this produces a logical search string (A AND B AND C AND D). Topics Dictionary 239 then searches for strings that have each of the terms of the logical search string. Any string that has all of the search string's terms, regardless of the order of the terms in the string, will be considered a match at step 615. If there are no strings that match the logical search string at step 615, N is reduced by one at step 616 before being compared to "1" at step 613.

If N is greater than one at step 613, step 614 is repeated using only N terms in each combination. Using the example above with N reduced to "3", Topic Dictionary 239 searches based on four logical search strings (A AND B AND C), (A AND B AND D), (A AND C AND D), and (B AND C AND D). If none of these logical search strings result in a match at step 615, then steps 616, 613, 614, and 615 are repeated until there is a match or until N equals one. If there is a match at step 615, Topics Dictionary 239 returns the matches to IEXPLORE 224 in a topic list embedded in an HTML page at step 617. Topics Dictionary 239 also removes the terms of the matching logical search string from the sub-query.

If N is equal to one at step 613, or after topics are returned at step 617, the process continues at step 618, where Topics Dictionary 239 searches for each remaining term of the sub-query on an individual basis. If there is at least one match at step 619, Topics Dictionary 239 determines if there are fewer matches than a maximum number at step 620. In the embodiment of FIG. 14B, the maximum number is twenty but other numbers are possible. If there are fewer than the maximum number of matches, Topics Dictionary 239 returns the corresponding topics at step 621. If more than one term of the sub-query matches, the corresponding topics are returned for each term.

In one embodiment, the topic lists returned at steps 612, 617 and 621 include lists of the matching topics, the number of matches for each topic, and weighting bits that indicate if the keywords match an entire string stored in Index database 967 or Index Server Files 974. Thus, if the user's query is "Tom Hanks in Saving Private Ryan", and "Saving Private Ryan" is stored under the MOVIE topic, a weighting bit would be returned with the topic MOVIE in the topic list.

After the topic list is returned at step 622 or if there are no matches at step 619 or if there are more than the maximum number of matches at step 620, Topics Dictionary 239 checks to see if there are more sub-queries to process at step 622. If there are more sub-queries, the process returns to step 606. If there are no more sub-queries, the process returns to step 600 of FIG. 14A to await a new user query.

The progressive reduction in size of the search units described above improves the precision of the topics returned by the present invention. Specifically, since a match on a multi-word part of the query is likely to be more relevant to the query than a match on a single word, the invention is more likely to return relevant topics than if searching was simply performed on the individual terms of the query.

To facilitate a dynamic database that includes the latest news events and latest additions to the network, the present invention periodically returns to step 602 from step 604 to retrieve updated versions of the pages on the network. The refreshed pages are then stripped to build an updated index as discussed above.

Through the processes described above in connection with Topics Dictionary 239, the present invention is able to automatically generate a list of indexed terms organized under topics. This list includes terms that have recently entered public discourse such as the names of people who were otherwise unknown to the general public one month earlier. This aspect of the present invention allows possible search goals to be identified based on search terms that are new to the public vocabulary. It also allows possible search goals to be identified based on new events. If there's a hurricane named Mitch in Florida and someone types in "hurricane Mitch", the present invention can determine that the searcher might be interested in the recent news on the Florida hurricane.

Returning to FIG. 10, after the topics have been returned by database server 239 at step 488, the remaining steps of FIG. 10 are executed thereby finishing step 554 of FIG. 13. The process of FIG. 13 then continues at step 556 where the topic list returned by database server 239 is stored for later use.

At step 558 of FIG. 13, QUERYENG 208 generates a topic list based upon the NLP bits produced during the natural language parse of the search query. As noted above, many terms returned in the NLP block are associated with a set of NLP semantic bits or flags. The topics are selected based upon associations between the topics and the NLP semantic bits. Table 1 provides examples of such associations found in embodiments of the present invention.

TABLE 1

| NLP BIT | TOPIC |
| --- | --- |
| +Nme | First name |
| +Compny | Business |
| +Cty | City |
| +Stte | State |
| +Cntry | Country |
| +Contnt | Continent |
| +Url | URL |
| +Email | E-mail |

TABLE 1-continued

| NLP BIT | TOPIC |
| --- | --- |
| +Wthr | Weather |
| +Food | Food |

Once topics have been identified for the NLP semantic bits returned by the NLP parse, the process of FIG. 13 continues at step 560 where the topics based on Topics Dictionary 239 and the NLP semantic bits are combined to identify the most likely topic for the search. In most embodiments, the topic lists produced by Topics Dictionary 239, and the NLP semantic bit process include the number of terms from the search query that have been found under each topic. To combine these types of topic lists, the number of hits under similar topics in different topic lists are added together in some embodiments. Thus, if the Topics Dictionary list included three hits under the topic Celebrity, and the NLP semantic bit list included two hits under the topic Celebrity, the combined topic list would include five hits under the topic Celebrity. In other embodiments, the topic lists remain separate and are used as independent clues to determine the user's goal.

When the topics are combined, the combined topic list is sorted at step 562 of FIG. 13. The sorting places the topic with the most hits at the top of the combined topic list. The combined topic list is then returned at step 564 to complete the process represented by box 328 of FIG. 8. If the topics are not combined, the individual topic lists are returned at step 564.

At step 330 of FIG. 8, QUERYENG 208 designates the keywords as the search terms to be used during searching. By reducing the users search query to just its keywords, the present invention improves the efficiency of the search performed by the selected search service. However, the original search query may also be used during the search.

At step 332, QUERYENG 208 selects a search area or repository where the search is to be performed. When operating on the searcher's initial search query the search area is a generic search engine. In particular, the search area is the best vector-space search engine available. A vector-space search engine is one that ranks documents on the number of times a term in the search query appears in the document, discounting those terms that are common to a large number of documents and giving priority to documents that have the term in the title or the first paragraph of the document. Each vector-space search engine has its own algorithm for weighting these different factors. In most embodiments, the initial search engine selected at step 332 is stored in Registry 222 of FIG. 2.

After the search area is selected in step 332, QUERYENG 208 determines if the search should be converted into a logical search query, also known as a logical function query, at step 334. Logical searches have logical operators between search terms that indicate the relationship between the terms. Examples of logical operators include "AND" to indicate that two terms should appear together in a document, "OR" to indicate that one of the terms or both of the terms should appear in the document, "NOT" to indicate that a term should not appear in the document, and quotes to indicate that the exact phrase found between the quotes should appear in the document.

For the initial query, a logical search is not constructed since the query is being submitted to a vector-space search engine and such search engines work better if they do not have to deal with logical operators. Later in the process, after possible search goals have been identified, the determination of whether to construct a logical search query is based largely on the user's search goal. For search goals that involve specific items, the present invention first attempts to locate a search area dedicated to the item. For example, if the user is looking for a celebrity's address, the present invention will look for a search area dedicated to celebrity addresses. If such a search area cannot be found, the present invention will convert the search query into a logical search query and will submit the logical search query to a search engine that supports such queries.

If a search area exists that is targeted at the user's goal, and the search area works better when it receives logical queries, the present invention will convert the query into a logical query. If the search area works better when it receives free text search queries, the query is not converted into a logical search query.

To determine if a particular search area is better suited to receiving logical search queries or free text search queries, QUERYENG 208 accesses a table that indicates the preferred search query form for a number of search areas. In most embodiments, this table is stored in default.htm.

Constructing a logical query is shown as step 336 of FIG. 8 and under embodiments of the present invention this step relies on the NLP data returned as a result of the natural language parse performed in step 324. The specific process for constructing the logical search is described in the flow diagram of FIG. 15, which begins with a step 700. In step 700, logical operators for the selected search area are identified by QUERYENG 208 because different search areas use different logical operators. For example, in some search areas the logical operator "AND" is represented by "+". QUERYENG 208 keeps a list of the characters and/or strings used by various search areas to represent the logical operators. This provides a significant advantage in the present invention because the user does not need to remember the specific operators used by a search area in order to efficiently use the search area. The present invention automatically inserts the proper operators for the search area.

For simplicity in the discussion below, the invention is described using the Boolean tags: "AND", "OR", "NOT", "NEAR", and "( )". However, those skilled in the art will recognize that the present invention actually inserts the search area's character or string in the logical searches constructed below. Thus, if the term "AND" is used in the discussion below and the selected search area represents "AND" using the "+" character, a "+" will actually be inserted in the logical search instead of the "AND".

Figure 15:
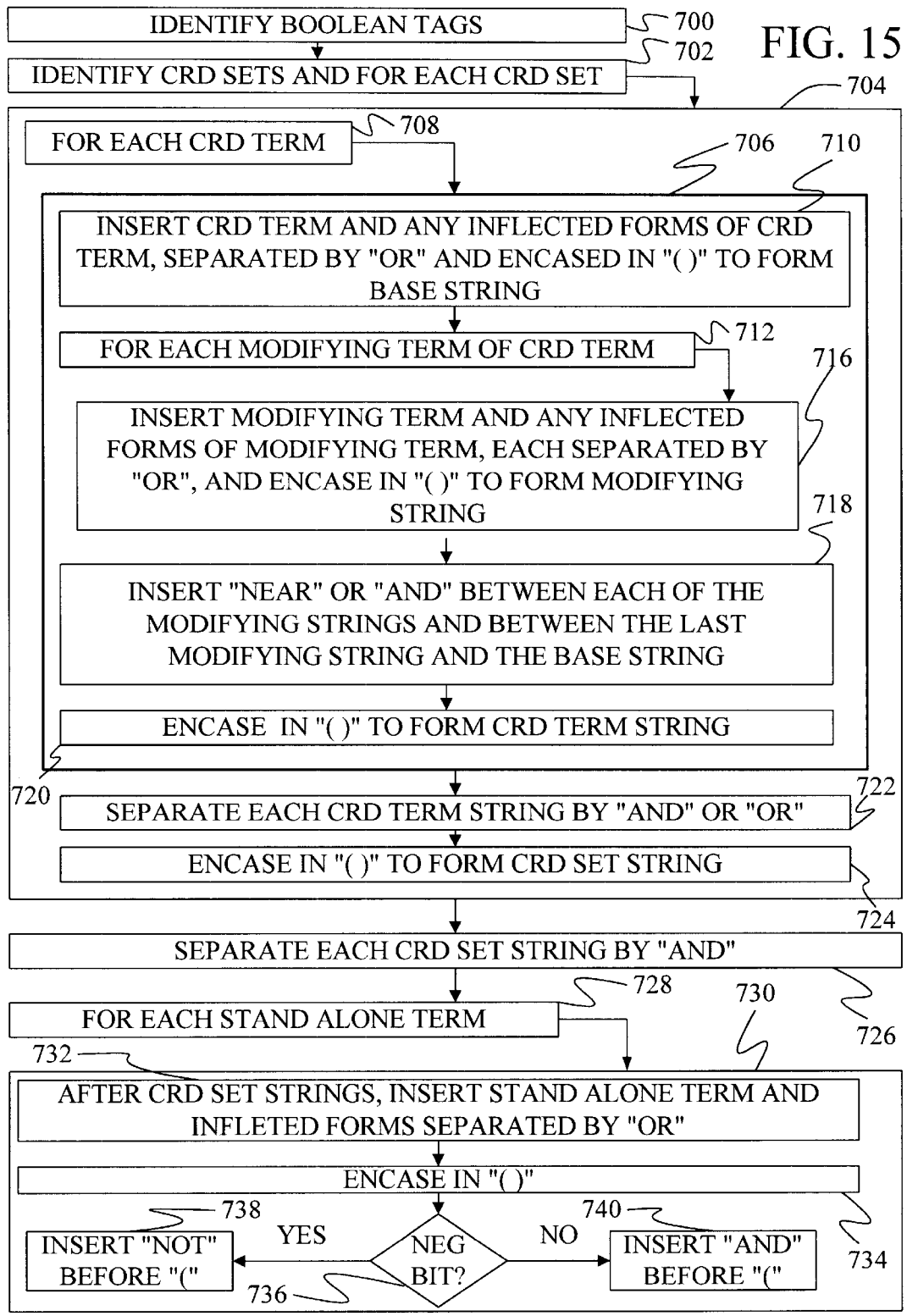
FIG. 15 is a flow diagram for constructing a Boolean search query based on NLP data under an embodiment of the present invention.

In step 702 of FIG. 15, the NLP data is examined to group terms that are in a coordinating relationship into a coordinating (CRD) set. Terms in a coordinating relationship are connected together by the words "or" or "and". For each CRD set at step 702, a set of operations is performed as shown in box 704 of FIG. 15.

The first operation in box 704 is actually a set of operations that are repeated for each CRD term in the CRD set. The operations performed for each CRD term are found in box 706 and the fact that these operations are repeated is represented in box 708.

The first operation in box 706 is step 710 where the current CRD term is inserted into the Boolean query along with any inflected forms of the CRD term returned by NLP. The CRD term and its inflected forms are separated from each other by "OR", and the complete string is encased in parentheses to produce: (CRD-TERM OR INFLECTED-FORM-#1 OR INFLECTED-FORM-#2 . . . OR INFLECTED-FORM-#N), which is referred to as a base string.

At step 712, each of the terms in the search query that modify the current CRD term are identified by QUERYENG 208 based on the NLP data. For each modifying term, the operations in block 714 are repeated. Specifically, step 716 of block 714 is repeated where the modifying term is inserted in the Boolean query along with any allowed inflected forms of the modifying term. The modifying term and its allowed inflected forms are separated from each other by logical OR's and the entire string is encased in parentheses to produce:(MODIFYING-TERM OR INFLECTED-FORM-#1 OR INFLECTED-FORM-#2 . . . OR INFLECTED-FORM-#N), which is referred to as a modifying string.

Note that the present invention is able to discriminate between terms that should have their inflected forms included in the Boolean search and terms that should not have their inflected forms included in the Boolean search. Specifically, QUERYENG 208 filters inflected forms of modifying terms that are grammatically incorrect. Thus, a modifying term such as black, as in the phrase "black bird", would not have its inflected form "blacks" included in the Boolean query. In fact, under the present invention, most modifying terms will not have an inflected form included in the Boolean query. In addition, proper nouns, such as Seattle, are not inflected by the present invention. This avoids adding non-existent terms, such as Seattles, to the Boolean query.

In step 718, either a "NEAR" or an "AND" is placed between each of the modifying strings as well as between the base string and its neighboring modifying strings. The decision between using "NEAR" and "AND" is made on the basis of the phrase strength currently employed by the web companion and on whether the chosen search service supports NEAR. The phrase strength is initially set at a strong default setting that would cause "NEAR" to be inserted between the modifying strings. However, the user may change this phrase strength during the searching process so that "AND" is used instead of "NEAR" by accepting a suggestion from the Web Companion to make this change.

In step 720, the modifying strings, the base string and their connecting logical operators are encased in parentheses to produce in the default case: (Base-String AND MODIFYING-STRING-#1 . . . AND MODIFYING-STRING-#N), which is identified as a CRD term string.

In step 722, Boolean operators are placed between each of the CRD term strings. The Boolean operators are selected on the basis of the coordinating relationship of the current CRD set. If the coordinating relationship is based on "or", an "OR" Boolean operator separates each CRD term string. If the coordinating relationship is based on "and", an "AND" Boolean operator separates each CRD term string. Note that after the initial query has been searched, the query may be refined by the present invention by asking the user to clarify the meaning of "and" in the search query. This process is discussed below in connection with FIGS. 35 and 36. Based on the clarification made by the user, an "OR" Boolean operator may be used between CRD strings that are based on "and".

In step 724, the CRD term strings and their corresponding Boolean operators are encased in parentheses to produce: (CRD-term-string-#1 AND/OR CRD-term-string-#2 . . . AND/OR CRD-term-string-#N), which is referred to as a CRD set string.

In step 726, each CRD set string is separated from all other CRD set strings in the Boolean query by inserting the Boolean operator "AND" between each CRD set string.

At step 728, the remaining stand-alone terms in the search query are added to the Boolean query. This is accomplished by repeating the steps found in box 730 for each stand-alone term. The first step in box 730 is step 732, which inserts the stand-alone term after the last CRD set string. In addition, step 732 inserts any inflected forms of the stand-alone term. A Boolean "OR" is inserted between the stand-alone term and each inflected form. In step 734, the stand alone term, its inflected forms, and the Boolean "OR" operators are encased in parentheses to produce: (STAND-ALONE-TERM OR Inflected-form-#1 . . . OR Inflected-form-#N).

At step 736, the current stand-alone term's respective NLP bits are examined to determine if the term is associated with a +NEG bit. This bit indicates that in the original search query the current term was modified by another term in such a way that it appears the user wants to exclude documents that include the current term. If the current term is not associated with a +NEG bit, a Boolean "AND" is inserted before the open parentheses of the stand-alone string at step 740. If the current term is associated with a +NEG bit, a Boolean "NOT" is inserted before the open parentheses of the stand-alone string at step 738. As with CRD relationships, the query may be refined by asking the user to clarify what they intended a negative modifier to signify. This process is discussed further below in connection with FIGS. 33 and 34. Based on the user's clarification, an "AND" may be used instead of "NOT" even though there is a negative modifier.

Once all of the stand-alone terms have been added, the process of constructing the Boolean search query is complete.

Note that in the discussion above, QUERYENG 208 treats multi-word entries returned by the natural language parse as a single term that is placed in quotes or is otherwise grouped as a Boolean phrase. Thus, the multi-word entry "Microsoft Corporation" would be considered a single term in the discussion above and would appear within phrase markers in the constructed Boolean query.

After the Boolean search has been constructed at step 336 of FIG. 8 or if a Boolean is not to be constructed at step 334, the process continues at step 338 where QUERYENG 208 determines if the search query is to be modified. Typically, such modifications result from user selections made in response to web companion displays discussed further below. If the query is to be modified at step 338, the process continues at step 340 where the query is appropriately modified.

After the query is modified in step 340, or if the query is not to be modified in step 338, the search query, either logical or free text, is submitted to the selected search area at step 342. The process of submitting the search to a search area located on the Internet is shown in detail in the flow diagram of FIG. 16.

Figure 16:
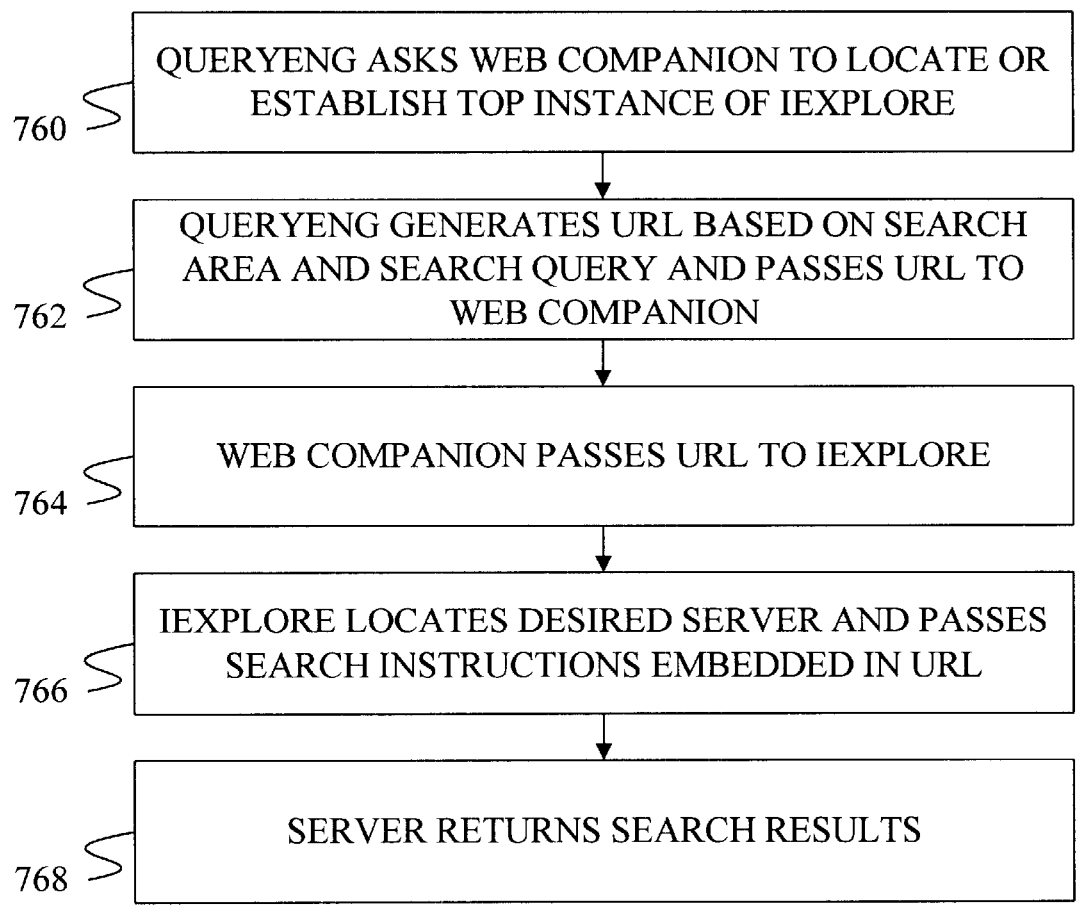
FIG. 16 is a flow diagram for submitting a search query to a search area under an embodiment of the present invention.

In step 760 of FIG. 16, QUERYENG 208 asks WEB COMPANION 200 to locate or establish a top instance of IEXPLORE, shown as IEXPLORE 218 in FIG. 2. QUERYENG 208 then generates a URL based on the selected search area and the search query, and passes the URL to WEB COMPANION 200 at step 762. At step 764, WEB COMPANION 200 passes the URL to IEXPLORE 218, which uses the URL to locate the server containing the desired search area and to pass the search query to the search area at step 766. When the search area completes its search, its respective server returns the search results to IEXPLORE 218 at step 768.

When the search results are returned to IEXPLORE 218, they are displayed by IEXPLORE 218 in an independent browser window. This step is represented in FIG. 8 as step 350.

After the search has been submitted at step 342, but before the results have been returned, QUERYENG 208 continues to operate at step 344, where it uses the possible topics determined in step 328, along with user profile clues, search scope clues and past web companion interactions to determine suggestions to be displayed in the next web companion screen produced by WEB COMPANION 200, QUERYENG 208, and DEFAULT.HTM 204. Thus, each of the items used to identify possible topics as well as user profile clues, search scope clues and past web companion interactions are all features of a clue stream for identifying search suggestions.

The user profile clues include such things as the user's age, their search history, their gender, things they have deemed as favorites, things in their browsing cache and their expertise level. The user profile may be constructed by asking the user for information or by tracking the user's interests based on the searches the user enters or the types of pages the user views.

The search scope clues provide an indication of what level of information the user is seeking. In other words, is the user looking for specific information or just a general overview? In one embodiment, the number of words in the user's initial search text provides a scope clue. Specifically, if the search text includes two or fewer words, the search is considered to have a broad scope. Other criteria for determining scope include broadly worded questions having phrases such as "tell me all about . . . " or "give me information about . . . " that indicate a broad scope. Or narrowly worded questions such as "who was . . . " or "when did . . . ", which indicate a narrow scope. In addition, the user's past searches may be used to determine scope since a searcher is more likely to want detailed information about a subject if they have searched it before.

The past web companion interactions are used to avoid presenting the user with the same suggestions more than once and to provide a logical progression in the types of suggestions provided to the user.

The user profile clues, search scope clues and past web companion interactions each provide interaction characteristics that indicate how the user wants to interact with the web companion. For example, based on the user profile, the web companion can determine whether the user is a child and thus whether the user expects the web companion to interact on a child's level. From the scope clues, the web companion can determine if the user is using the web companion for browsing or to find specific information. From the past web companion interactions, the web companion can identify the types of suggestions that the user is most likely to be interested in seeing next.

In most embodiments, the suggestions that are likely to be most helpful to the user are provided first, with less helpful suggestions provided in later screens. In accordance with this philosophy, some embodiments of the present invention try to provide suggestions based on a users possible search goals first.

To identify possible search goals, the present invention uses a support vector machine (SVM) 209 of FIG. 2 that treats each of the clue stream features as a component of a feature vector also known as a goal vector. The support vector machine compares the query's goal vector to a number of goal surfaces in an n-dimensional goal space defined by n features. Each n-dimensional goal surface separates the goal space into two sections. If a query's goal vector is in one section, the user has the particular search goal associated with the goal surface. If the query's goal vector is in the other section, the user does not have the particular search goal. For example, a "celebrity" goal surface may divide the goal space into a first section that indicates that the user's goal concerns a celebrity and a second section that indicates that the user's goal does not concern a celebrity. In addition, based on the distances between the query's goal vector and a goal surface, the SVM is able to return the probability that the user has a particular search goal.

Figure 17:
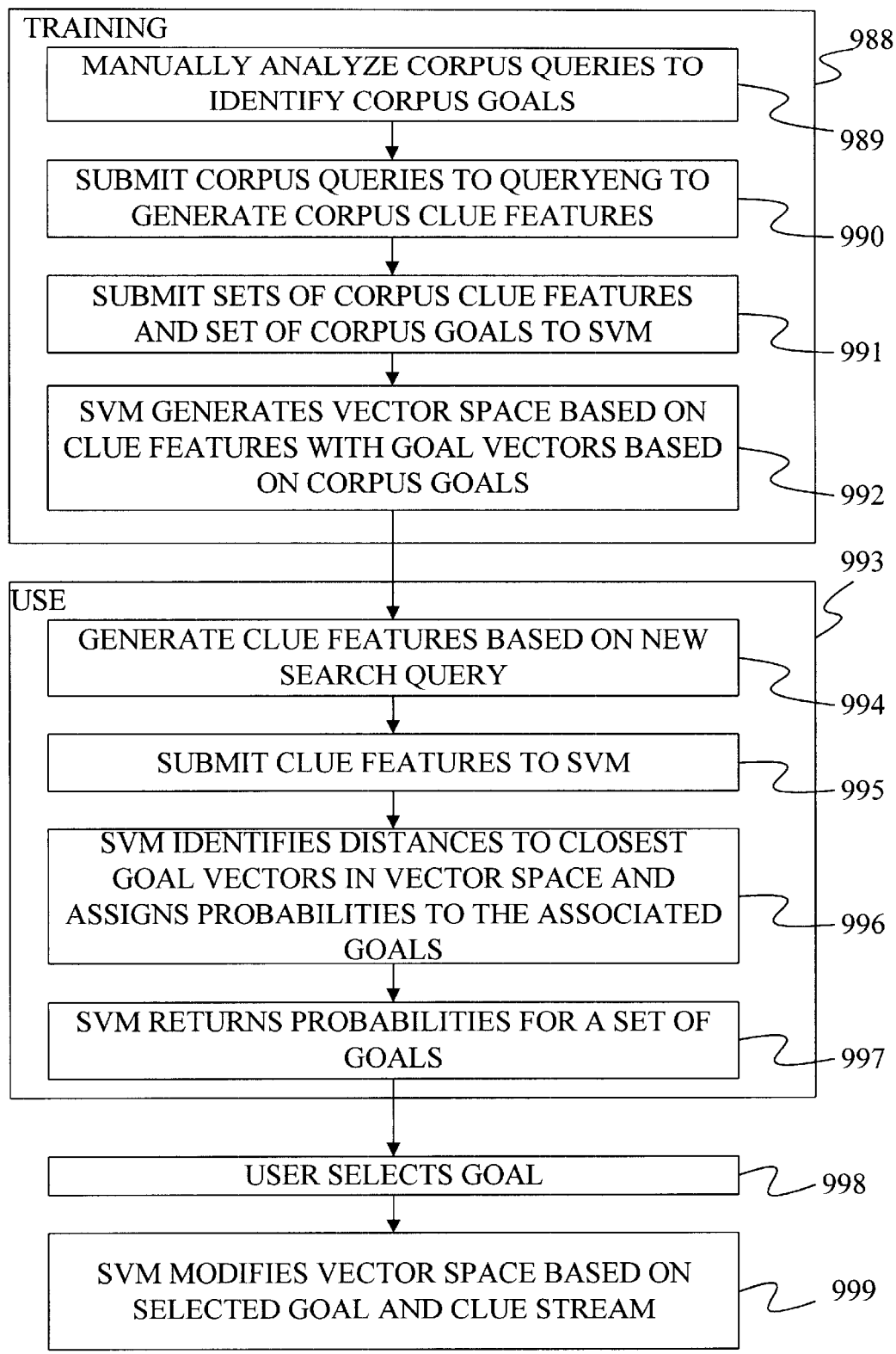
FIG. 17 is a flow diagram for training and using the support vector machine of FIG. 2.

The training and use of SVM 209 is shown in the flow diagram of FIG. 17. The steps required to train SVM 209 are shown in training box 988. Through these steps, SVM 290 defines the goal vector space and populates it with goal surfaces. The training begins at step 989 where a person manually analyzes a corpus of queries to assign each query to between one and four potential goals. To do this, the person looks at each query and attempts to determine the user's search goal from the query.

The corpus of queries is then submitted to QUERYENG 208 at step 990. QUERYENG 208 generates a list of features for each query including NLP semantic bits, a list of topics, etc. Advanced embodiments include user profile features associated with the user who generated the training query. For each query, this list of features and the associated potential tasks for that query are then submitted to SVM 209 at step 991.

SVM 209 generates the goal vector space in step 992 by converting each set of features into a vector in the goal vector space. The resulting goal vector space is then divided by a set of goal surfaces based on the goals identified for each training vector. Techniques for generating these goal surfaces are discussed in greater detail in a pending patent application entitled METHODS AND APPARATUS FOR BUILDING A SUPPORT VECTOR MACHINE CLASSIFIER, filed on Apr. 6, 1998, and having Ser. No. 09/055,477, which is hereby incorporated by reference. In most embodiments, the surfaces are represented by equations that define hyper-planes, which extend through the goal space.

After SVM 209 has been trained, it is ready to be used to identify possible goals of a new search query. The steps involved in using SVM 209 are shown within box 993 of FIG. 17.

In step 994, the new search query is submitted to QUERYENG 208, which identifies a set of features using the techniques described above. The features are submitted to SVM 209 at step 995 and SVM 209 converts the features into the query's goal vector.

At step 996, SVM 209 determines where the query's goal vector resides in the goal space relative to the goal surfaces. In particular, for each goal surface, SVM 209 determines if the query's goal vector is on the surface's "positive" side indicating that the user's actual search goal is the search goal associated with the surface, or the surface's "negative" side indicating that the user's search goal is not the search goal associated with the surface.

In addition, SVM 209 determines the distance between the query's goal vector and each of the goal surfaces in the goal space. The distance measurement can weight all features equally or can give additional weight to certain features, such as topics Based on the relative distances between the query's goal vector and each of the goal surfaces, SVM 209 assigns probabilities to each goal. Thus, if the query's goal vector is located next to a number of goal surfaces, there is a low probability that any one goal is the user's actual goal. If the query's goal vector is far from a particular goal surface and is on the positive side of the goal surface, there is a high probability that the associated goal is the user's actual goal.

In step 997, SVM 209 returns each of the calculated probabilities to QUERYENG 208 for further processing as described below.

In some embodiments, SVM 209 can be trained on a continuing basis using queries entered by the user. This training requires that the user select a goal that is presented to them as shown in step 998. Based on this selected goal, and the features associated with the user's query, SVM 209 adds an additional corpus goal vector to the vector space at step 999. Alternatively, SVM 209 can modify an existing corpus goal vector so that it moves closer to the query's goal vector.

The search goal probabilities returned by SVM 209 may also be generated using a simple rules-based engine comprised of a series of complex case statements that test combinations of search clues. The search goal probabilities may also be determined using a Bayes Net.

QUERYENG 208 uses the returned search goal probabilities to select a set of search suggestions. Thus, if there is a high probability that the user is looking for used car prices, QUERYENG 208 will suggest searching a site listing used car prices. If the probability of a search goal is too low, QUERYENG 208 does not make a suggestion based on that goal.

In addition to or instead of providing suggestions based on the possible search goals, embodiments of the invention can also provide scope-based suggestions, which are based almost entirely on scope clues. Examples of scope-based suggestions are shown in FIGS. 28 and 29 discussed further below. Since scope-based suggestions tend to be less helpful than goal-based suggestions, many embodiments will show goal-based suggestions instead of scope-based suggestions if possible. QUERYENG 208 can also provide a suggestion to fine-tune the search query or to select a different search engine. However, since these suggestions are not as helpful, they are usually presented only if other suggestions cannot be made.

Once QUERYENG 208 has determined the suggestions it will display, the process continues at step 346 where the character's behavior changes or is modified based on the suggestions being displayed. For example, if suggestions relating to travel are displayed, the character can be modified so that it appears in travel clothes. Examples of such modifications to the character are described below in connection with the examples of screens displayed by the present invention.

At step 348, the next web companion screen is displayed, which contains text and control buttons that appear within a balloon produced by WEB COMPANION 200. The text and control buttons are produced by QUERYENG 208 and IE4 control 202, respectively. The screen also includes an animated character produced by Search Agent 206 of FIG. 2, which in one embodiment is implemented through Microsoft AgentX technology. Note that the web companion screen appears at around the same time that the search results from the last search are displayed in a browser window by IEXPLORE 218. Examples of the web companion screens are shown in FIGS. 18, 19, 20, 21, 22, 23, and 24, which are each discussed below.

Figure 18:
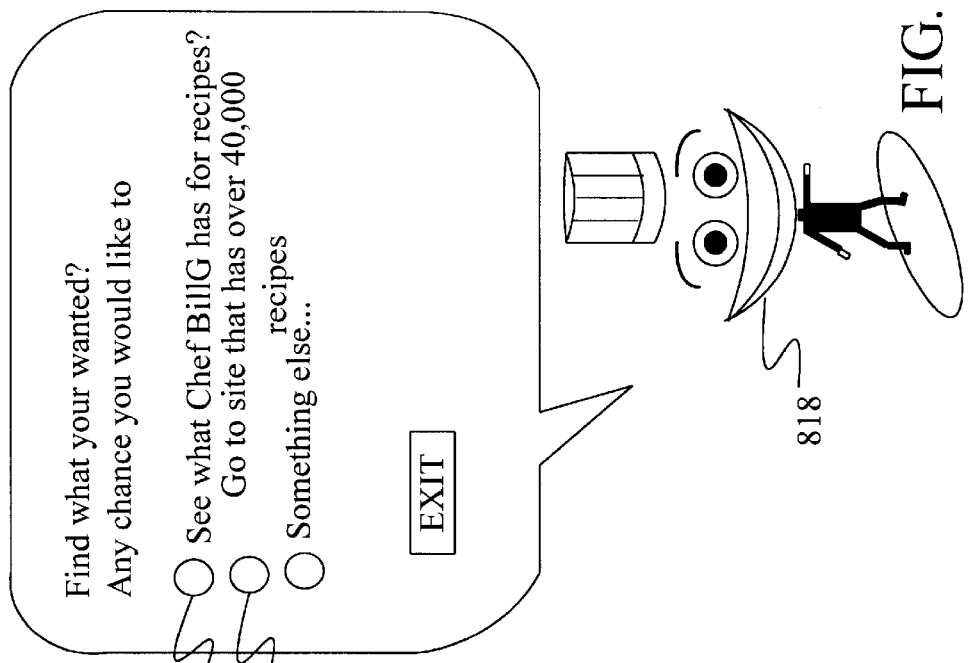
FIG. 18 is an example web companion display produced in response to a search query directed toward a country or continent.

In FIG. 18, the present invention provides a web companion screen based on a search query that included the terms East Africa and Kenya. Based on these terms, QUERYENG 208 has identified possible topics of country and continent leading to possible goals 802, 804, 806, and 808 of planning a trip, booking a trip using Expedia, finding cheap flight information, and gathering general information about the continent of Africa, respectively. Note that in many embodiments these goals are shaped in part by the user's profile. If the user is only ten years old, the search goals would be limited to obtaining information about Africa since it is unlikely that a ten year old will be booking a trip to Africa.

In FIG. 18 the animated character 800 has been modified in step 346 of FIG. 8 in light of the displayed suggestions. In particular, character 800 is wearing a hat and carrying a camera to reflect the travel related suggestions in balloon 810.

Balloon 810 also includes a suggestion 812 that allows the user to indicate that they have found what they were looking for. If the user indicates that their search was successful by selecting suggestion 812, QUERYENG 208 makes a record of the user's search query and the final URL that produced the results the searcher wanted. In one embodiment, this record is kept in registry 222, but in other embodiments may be kept in any suitable memory location. QUERYENG 208 accesses this record each time a new search query is entered by the user so that it can determine if the user has made this search before. If it finds a record of a successful result for this search, QUERYENG 208 will suggest to the user that they use this past result. In other embodiments, this is implemented in SVM 209 by adding the URL as a corpus goal with the features associated with the search query forming the corpus goal vector. In further embodiments of the invention, QUERYENG 208 keeps track of the number of times the user selects this past result. If the number of times is greater than some chosen threshold, QUERYENG 208 automatically displays the result without making the suggestion to the user.

Figure 19:
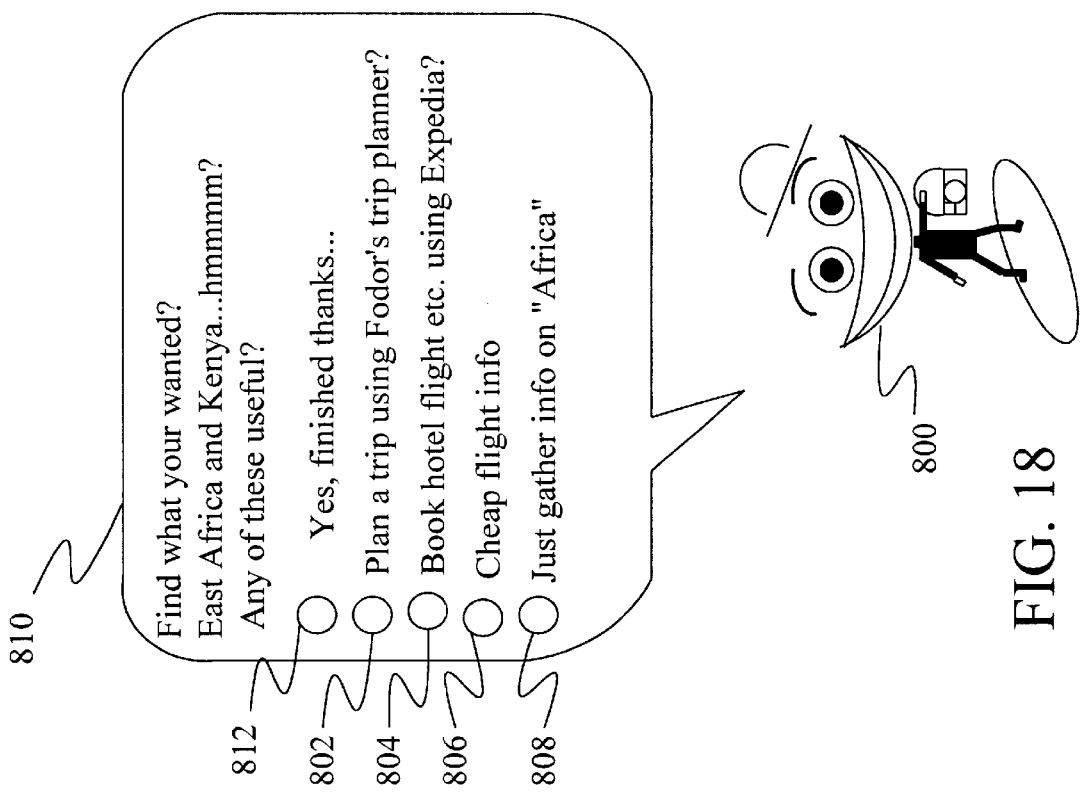
FIG. 19 is an example web companion display produced in response to a search query directed toward food.

In FIG. 19, the user's search includes terms related to food and based on probabilities from SVM 209, QUERYENG 208 has identified possible search goals 814 and 816 that relate to recipes. QUERYENG 208 has also caused SEARCH-AGENT 206 to modify animated character 818 so that it is wearing a chef's hat.

Figures 20, 21:
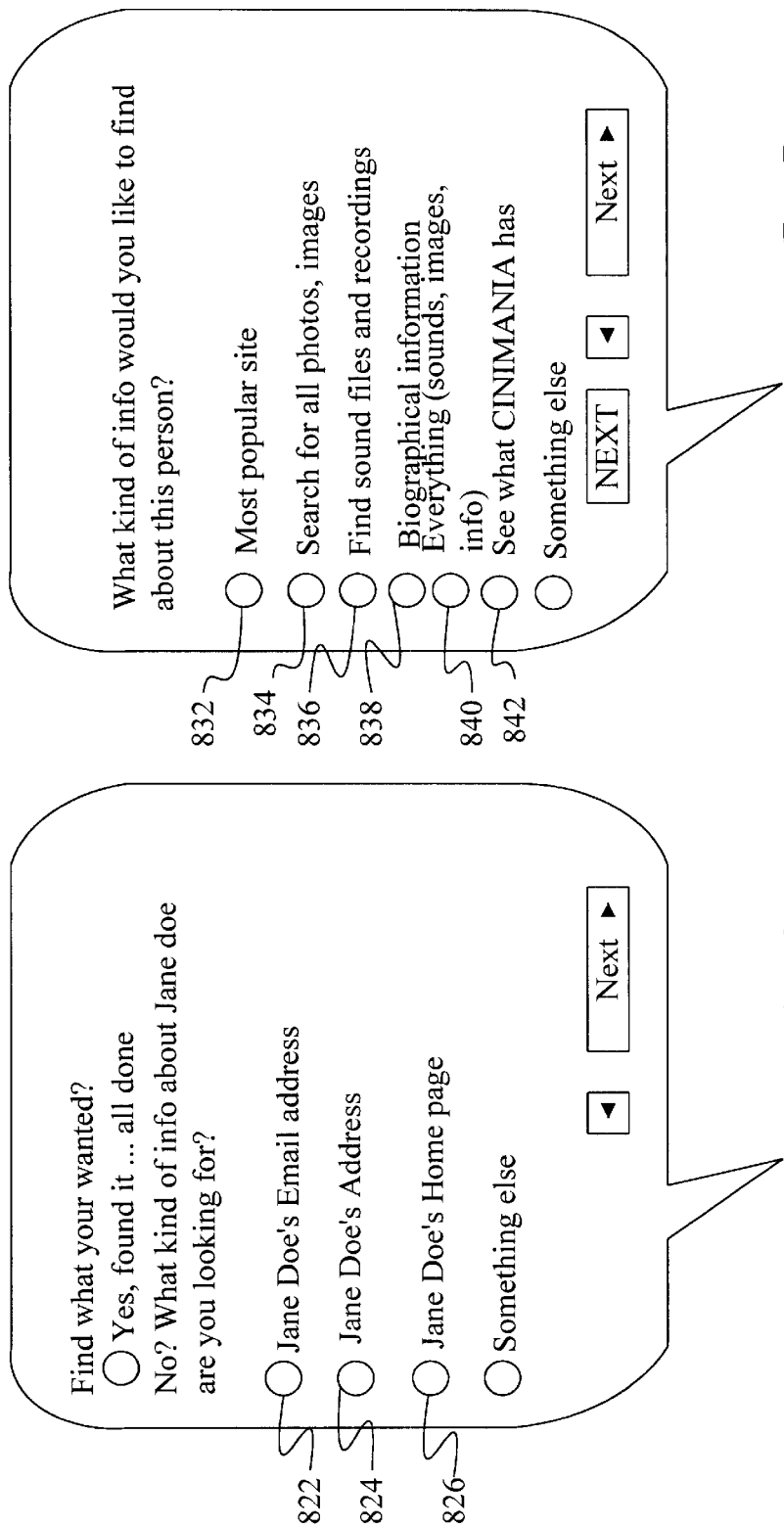
FIG. 20 is an example web companion display produced in response to a search query directed toward a non-famous person's name.
FIG. 21 is an example web companion display produced in response to a search query directed toward a famous person's name.

FIG. 20 shows a display based on a user query that included a person's name. Although the name topic has been identified, the name did not trigger the celebrity topic. As such, the SVM has determined that the displayed suggestions should be focused on possible search goals a searcher may have relative to a non-famous person. These possible goals include wanting the person's e-mail address (suggestion 822), the person's mail address (suggestion 824), and the person's home page (suggestion 826).

In FIG. 21, the user's search text also included a person's name. However, the person's name was either indexed by URL index 241 or database server 239 of FIG. 2 as being a celebrity name. Based on the celebrity topic returned by one of these index components, along with other features, QUERYENG 208, using SVM 209 has provided a different set of suggestions from the suggestions shown in FIG. 20. Specifically, FIG. 21 includes suggestions 832, 834, 836, 838, 840, and 842 that respectively suggest, going to the most popular site concerning the celebrity, searching for photos and images of the celebrity, finding sound files of the celebrity, finding biographical information about the celebrity, finding everything possible about the celebrity, and seeing what CINIMANIA has to say about the celebrity.

Figure 22:
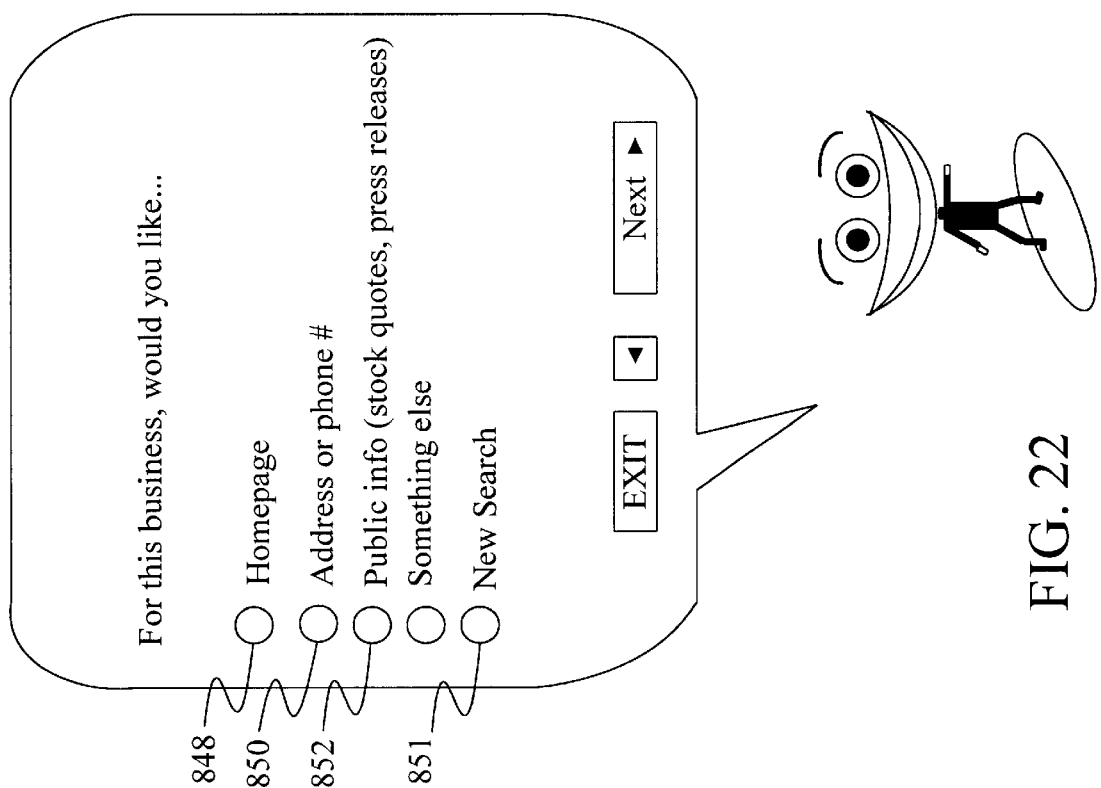
FIG. 22 is an example web companion display produced in response to a search query directed toward a company name.

In FIG. 22, the search entered by the user included a business name that produces a hit for the topic BUSINESS. Based on this topic, and other features, QUERYENG 208 determined that the user may be interested in the business's homepage (suggestion 848), the business's address or phone number (suggestion 850), or public info about the business, such as stock quotes (suggestion 852).

Figure 23:
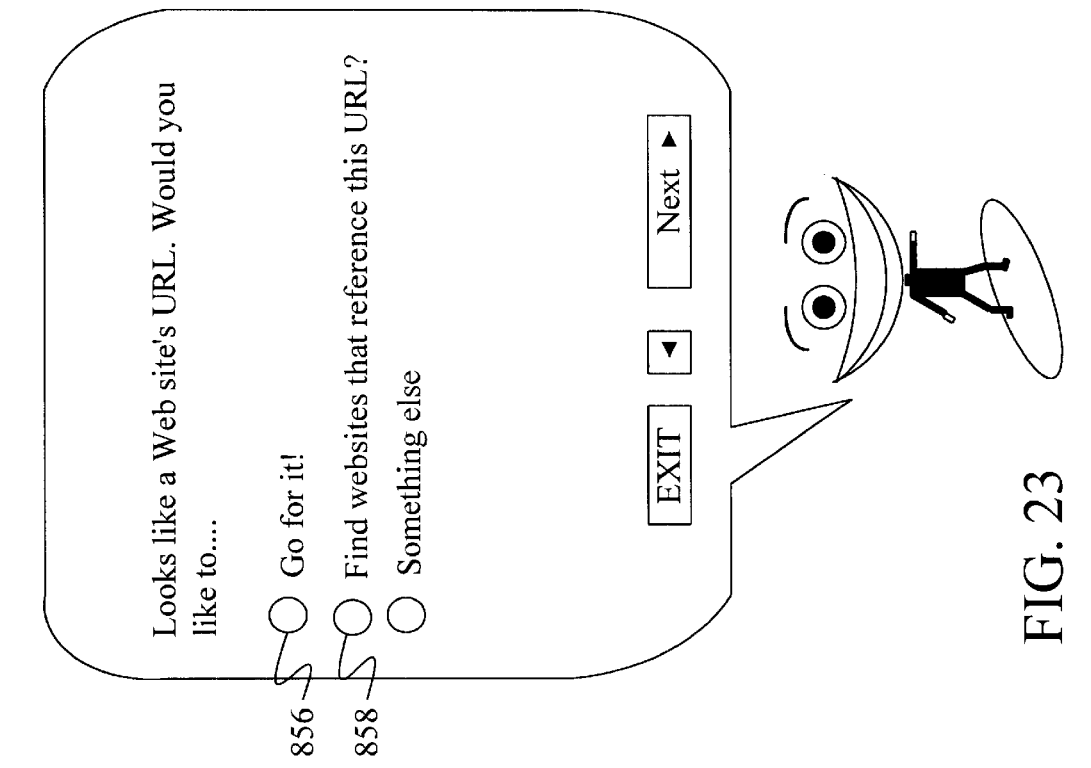
FIG. 23 is an example web companion display produced in response to a search query directed toward an URL.

In FIG. 23, the user's search appears to have included a URL. In response, QUERYENG 208 suggests going to the web site represented by the URL (suggestion 856), and finding web site's that reference the URL (suggestion 858).

FIG. 24 shows a display of the present invention produced by QUERYENG 208 in response to a query that includes a city name. Since city names trigger an NLP bit to be produced by NLP component 227 of FIG. 2, QUERYENG 208 is able to identify "city" as a possible topic of the search. As such, QUERYENG 208 produces suggestions that include possible goals related to the topic "city". These suggestions include looking at an entertainment site for the name of the city (suggestion 859), looking in the cities yellow pages (suggestion 861), booking a flight to the city using Expedia (suggestion 863), obtaining cheap flight info (suggestion 865), and searching for historical information from the Library of Congress (suggestion 867).

FIG. 25 shows a display triggered by a hit for a movie/restaurant topic. Based on this topic, QUERYENG 208 suggests looking at a web site that is focused on a cities local arts and entertainment, (suggestion 860) and looking at the yellow pages (suggestion 862).

Figure 27:
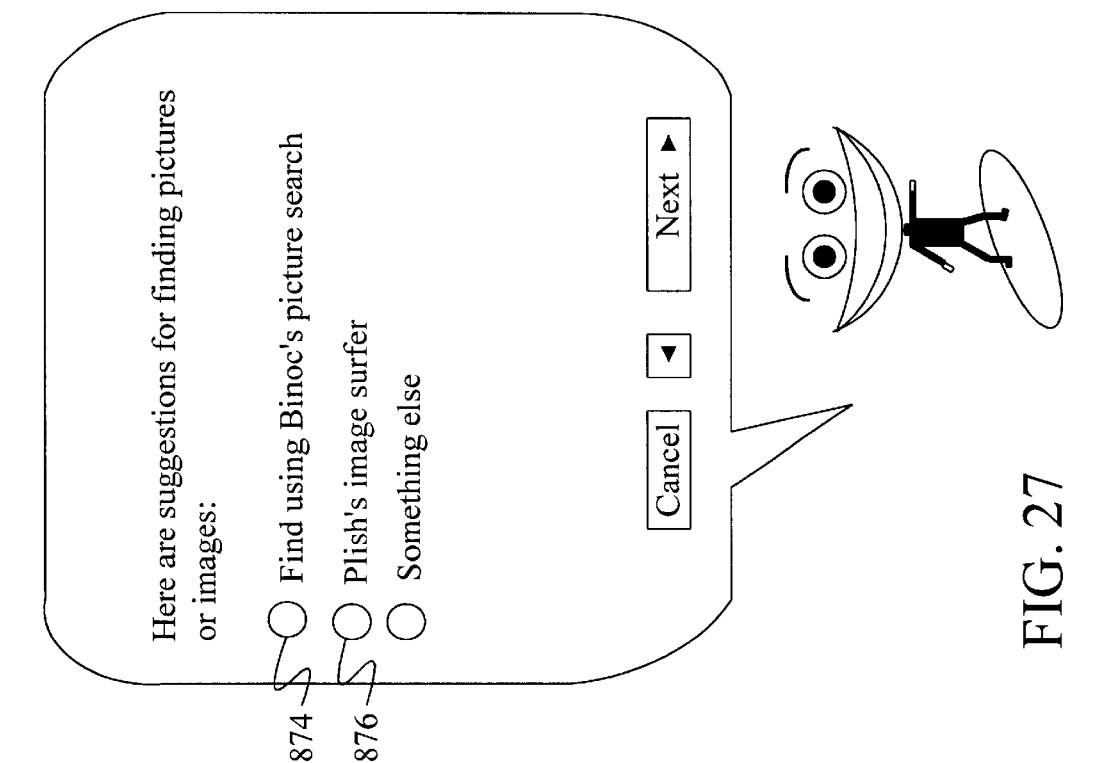
FIG. 27 is an example web companion display produced in response to a search query directed toward pictures.
Figure 26:
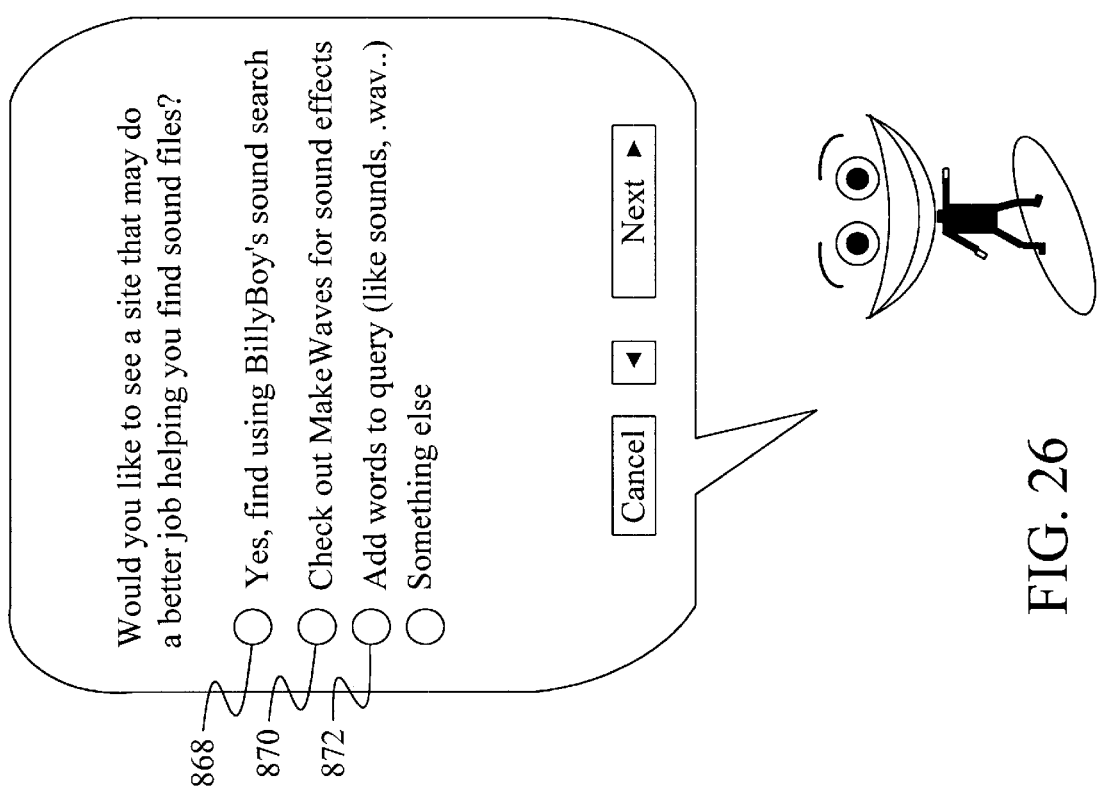
FIG. 26 is an example web companion display produced in response to a search query directed toward sound.

FIGS. 26 and 27 provide examples of context-based or media type suggestions found in displays produced when QUERYENG 208 is able to identify possible contexts or media types that the user may be looking for. On the Internet, files come in a wide range of media types including sound, video, picture, and text. In FIG. 26, based on a topic hit from category index 239 of FIG. 2, QUERYENG 208 has determined that the user is looking for a sound file. To find this media type, QUERYENG 208 suggests looking in two sites, BillyBoy's sound search (suggestion 868) and Make-Waves (suggestion 870). In addition, at suggestion 872, QUERYENG 208 suggests modifying the search text to include terms like ".wav". In FIG. 27, the user's search included a term that category index 239 placed under the topic "pictures". Based on this topic, QUERYENG 208 suggests searching for a picture in two different search areas: Binco's picture search (suggestion 874) and Plish's image surfer (suggestion 876).

FIG. 28 provides an example of scope based suggestions. In particular, the display of FIG. 28 shows suggestions provided when QUERYENG 208 has identified that the search has a narrow scope. In other words, that the user wants specific, detailed information. Normally, the display of FIG. 28 is only provided if a possible goal could not be identified based on the search or if the user did not select one of the offered goals in an earlier screen. The display includes suggestions for other search areas that provide specific information such as Microsoft's Encarta online encyclopedia (suggestion 878), online dictionaries (suggestion 880) and maps (suggestion 881), and the Internet Public Library (suggestion 882).

FIG. 29 also provides scope based suggestions, except that the suggestions found in FIG. 29 are for a search having a broad scope, where the user wants general information. The suggestions include going to a site that has common question and answers, known as a Frequently Asked Question (FAQ) site, going to the most popular site for the search term in the query, going to a newsgroup about the search term, and going to a site that has been rated by editors as the best site for the search term (suggestion 883). In addition, suggestion 884 of FIG. 29 suggests obtaining an overview of the search terms.

Figure 30:
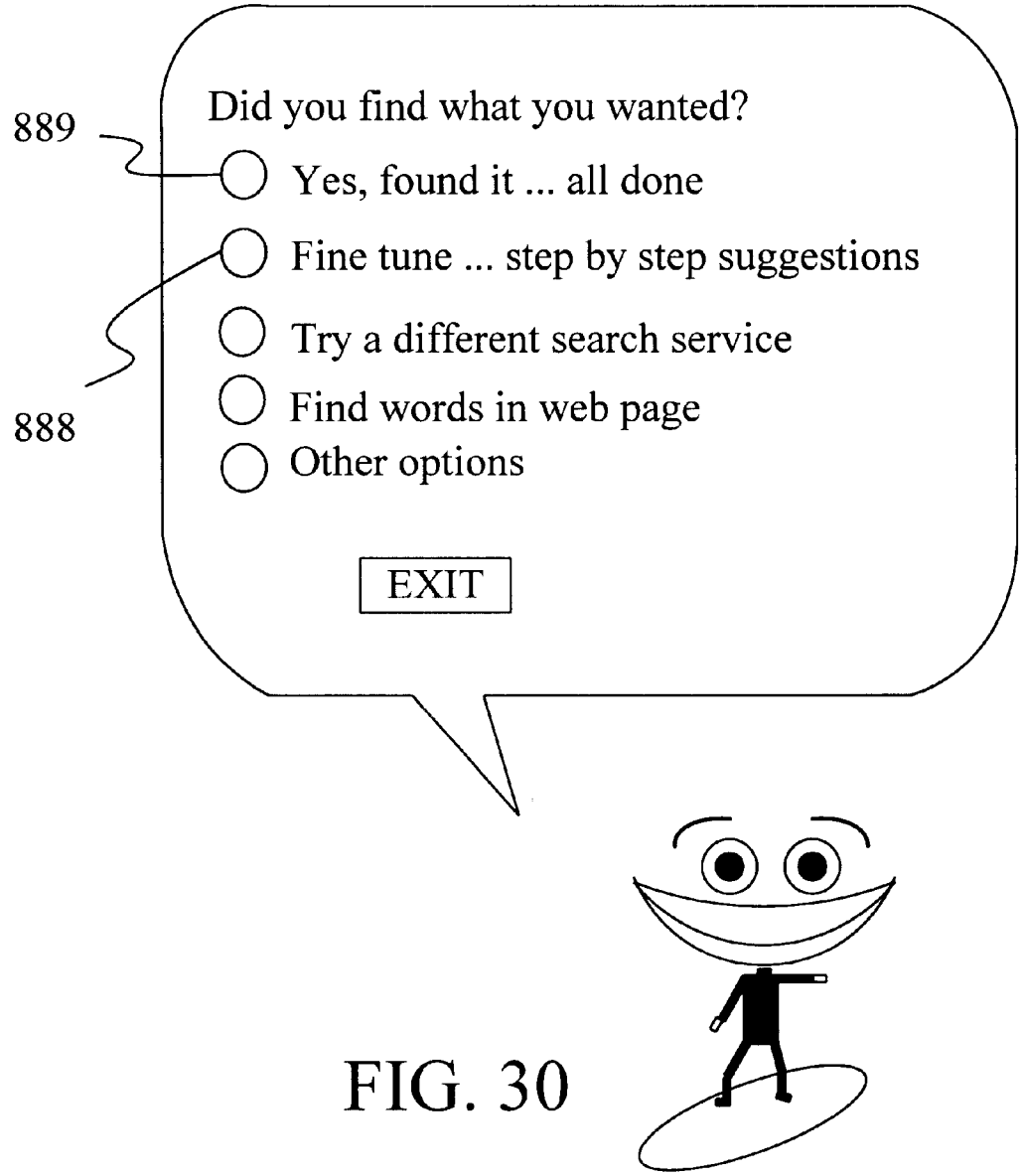
FIG. 30 is an example web companion display produced to provide alternative search suggestions.

FIG. 30 is a display that provides suggestions such as fine-tuning the search (suggestion 888) and trying a new search service (suggestion 889). In some embodiments, the display of FIG. 30 is only shown if QUERYENG 208 could not identify possible goals or scope based suggestions or if the user did not select any of the presented goals or scope based suggestions found in previous screens presented to the user.

Depending on what the user selects from the displayed screen, the process of FIG. 8 continues along different paths.

For example, if the user selects option 851 of FIG. 22 or option 889 of FIG. 30, thereby indicating that they want to perform a new search, the process continues at step 320 of FIG. 8 where QUERYENG 208 solicits the user for the new search text. The selection of the new search option is shown in FIG. 8 by NEW SEARCH box 352, which provides a path to step 320.

If the user selects the exit option in any of the screens, WEB COMPANION 200 closes all of the modules that it has invoked except IEXPLORE and closes itself. This option is indicated in FIG. 8 by EXIT box 354, which provides a path to end state 356.

If the user selects any other suggestion such as a search goal, a context based suggestion, a scope based suggestion, a suggestion to use a different search service, or a suggestion to fine-tune the search query, the process continues at step 358 where the user's selection is recorded for later use in step 344 to determine future screens to be displayed. The selections that lead to step 358 are shown representatively as GOALS box 360, CONTEXT BASED box 362, SCOPE BASED box 364, DIFFERENT SEARCH SERVICE box 366, and FINE-TUNE box 368. These boxes are shown only to illustrate some of the possible suggestions that may be provided to the user. Other suggestions are possible within the scope of the invention.

After the user's selection has been recorded in step 358, QUERYENG 208 determines at step 370 if the user's selection requires additional screens to be displayed before a new search can be submitted or before the present search can be submitted to a new search area. If additional screens need to be displayed, QUERYENG 208 displays those screens at step 372.

One suggestion that can lead to additional screens is suggestion 888 of FIG. 30, which suggests fine tuning the search query. If suggestion 888 is selected, QUERYENG 208 determines if the existing query includes any ambiguities. For each ambiguity it detects in the search query, QUERYENG 208 provides a disambiguation screen that requests additional information to disambiguate the query. Examples of such disambiguation screens are shown in FIGS. 32, 34, and 36.

FIG. 32 shows a disambiguation screen used to remove an ambiguity as to time. An example of a query that includes an ambiguity as to time is shown in FIG. 31. That query states "I want recent articles on Microsoft word." This query is ambiguous as to time because it is not clear what the user means by "recent". QUERYENG 208 detects this ambiguity because the term "recent" receives an NLP semantic bit of "+tme" that indicates that the term relates to time. Based on this NLP bit and the user's desire to fine tune their query, QUERYENG 208 produces display 900 of FIG. 32, which provides a selectable list of options designed to clarify what the user means by the word "recent". For example, entry 902 in display 900 would restrict the search to pages that are less than thirty days old. Entry 904 would restrict the search to pages that are six months to one year old.

FIG. 33 provides a second example of an ambiguity in a search query. The search query in FIG. 33 is "Why do men lose their hair and not women?" This query is ambiguous in a Boolean sense because it includes the word "not". In Boolean queries, "not" causes many search engines to exclude pages that contain the word following the "not". In the context of the query of FIG. 33, a Boolean based search engine would exclude pages that have the word "women". QUERYENG 208 identifies this ambiguity on the basis of an NLP bit, known as the "+neg" bit, that is returned by NLP component 227 in response to the presence of "not" in the search query. To clarify whether the user meant to exclude pages that have the word "women", QUERYENG 208 generates display 910 of FIG. 34. Display 910 provides the user with a choice of excluding pages that have the word "women" or not excluding pages that have the word "women".

FIG. 35 shows a third example of a search query with an ambiguity in it. Search query 916 in FIG. 35 is "I want information on skiing and snow-mobiling in Wyoming." This search is ambiguous because of the word "and" in the query. Most Boolean based search engines would interpret this query as requiring that each returned page include both the term "skiing" and the term "snow-mobiling". However, a user that inputs such a search query typically wants information on "skiing" OR "snow-mobiling". This type of ambiguity is flagged by NLP component 227 in the NLP data returned for the terms "skiing" and "snow-mobiling". Specifically, NLP component 227 places these terms in the same coordinating (CRD) set and indicates that they are joined by the term "and". When determining if the search includes ambiguities, QUERYENG 208 looks for such coordinating sets and provides a disambiguation display, such as display 920 of FIG. 36, for each such coordinating set. In display 920, the user is asked whether they intended to find sites on either skiing or snow-mobiling, or intended to find pages that had both skiing and snow-mobiling.

Figure 37:
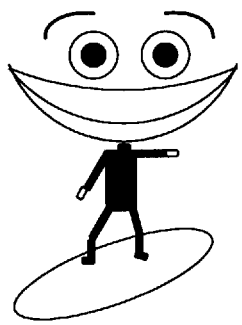
FIG. 37 is an example of a web companion display produced to fine tune the search query if it does not contain ambiguities.

If the user chooses to fine tune their search and there are no ambiguities in the search query, QUERYENG 208 generates display 930 shown in FIG. 37. Display 930 includes suggestions to use a different search engine, see a list of past searches, add, delete or change words, exclude words from the search, restrict the search to a range of dates, directly edit the Boolean query, see synonyms and hypernyms of terms in the search query, and change the phrase strength of the constructed Boolean. As noted above, the phrase strength of the Boolean determines whether modifying terms are connected to the terms they modify by a Boolean "AND" or a Boolean "NEAR". Many of the suggestions shown in display 930 will lead to additional displays to solicit the specific information. For example, if the user wants to exclude a term, an additional display is presented to ask the user what term they want excluded.

After QUERYENG 208 has collected the additional information it needs to construct and submit a new search query, or if QUERYENG 208 did not need additional information, the process returns to step 332 where a search area is selected. The search area selected on return to step 332 is chosen in large part on the basis of the suggestion selected by the user. For example, each search goal suggested to the user is usually associated with a specific search area. Thus, if the user has selected a suggested search goal, QUERYENG 208 is able to directly identify a search area associated with that search goal.

The associated search area is often focused on providing information related to the search goal. For instance, suggestion 822 of FIG. 20 suggests a search goal of finding a person's email address. This search goal is associated with a search service that is dedicated to storing and searching through email addresses. Similarly, suggestion 814 of FIG. 19, which suggests the search goal of seeing what Chef BillG has for recipes, has Chef BillG's recipe page as its search area.

Search areas are also associated with context-based suggestions (also known as media type suggestions) and scope-based suggestions. Thus, if the user selects context-based suggestion 868 of FIG. 26, which suggests using BillyBoy's sound search to find sound files, QUERYENG 208 will select BillyBoy's sound search as the search area. Similarly, if the user selects scope-based suggestion 883 of FIG. 29, which suggest looking at the best sites about a topic, QUERYENG 208 will select a search engine that reviews all of the sites it includes in its database. Additionally, if the user selects a suggestion to look at an overview of a topic, QUERYENG 208 selects a search area that has excellent topic overview information.

In addition, if the user has adopted a suggestion to change their search service, QUERYENG 208 will select the search area based on the new search service chosen by the user.

Under the present invention, the user does not have to be familiar with the search area or the information it provides in order to utilize it. The user only needs to select a suggestion that they believe will advance their search. For example, if a user selects a suggestion to find a user's email address, they do not need to know about the email search area the present invention will search. In addition, since many of the suggestions are associated with relatively obscure search areas, the present invention allows users to utilize a broader range of search areas than they would otherwise use.

After the search area has been selected, QUERYENG 208 determines if a logical query should be constructed based on the selected search area and the present form of the search query. If the search query is already in logical form or if the search area works better with free text searches, a logical query would not be constructed.

After the logical search is constructed at step 336 or if at step 334 it is determined that a logical search query will not be constructed, QUERYENG 208 determines if the query should be modified. The modification of the query is based largely on the suggestion selected by the user. For example if the user has selected scope-based suggestion 884 of FIG. 29, which suggests looking at an overview of a topic, the search query is modified to include terms such as "overview" and "official site". By adding these terms, QUERYENG 208 improves the likelihood that the search query will return pages of a general scope.

The search query is also modified if the user selects certain context-based suggestions, such as suggestion 872 of FIG. 26. In suggestion 872, the user is asked if they are interested in adding words to the query that relate to sound files. The selection of this suggestion causes QUERYENG 208 to modify the query to include these sound file terms.

Certain search goal suggestions also lead to modification of the search query. For example, if the search goal is to find information on antique cars, QUERYENG 208 diplays a suggestion to add words like automobile, auto, and classic to the query.

The modification of the query can be more sophisticated than just adding terms. For example, if the user has fine tuned a search query that included an ambiguity, QUERYENG 208 can modify the search query to remove the ambiguity. Thus, QUERYENG 208 can change the coordinating relationship between two words from "AND" to "OR" and can change a connecting term such as "NOT" to "AND" to reflect the user's true searching intentions. In addition, if the search query included an ambiguity as to time, such as including the term "recent", QUERYENG 208 can replace "recent" with a specific set of dates. For certain search areas, ones that include date range fields, QUERYENG 208 removes the term "recent" from the search query and adds instructions in the query to fill out the date range field of the search area with the date range selected by the user. By removing the term "recent" from the search query, the present invention keeps the search area from looking for pages that include the term "recent" and instead focuses the search area on looking for pages that were produced on certain dates. This better reflects the user's searching intention.

The process shown in the flow diagram of FIG. 8 continues to repeat the cycle of presenting search suggestions in parallel with search results, recording the user's suggestion, selecting a search area, constructing and/or modifying a search and submitting the search to the search area until the user elects to exit the web companion program or start a new search. By keeping track of past web companion interactions, the present invention is able to present new suggestions to the user at each cycle, in a manner similar to the way a friend or librarian would suggest alternative searching techniques.

In FIG. 2, WEB COMPANION 200, IE4 control 202, SEARCH-AGENT 206, QUERYENG 208, and SPELLCHECK 221 are shown on a client 199, and NLP component 227, Topics Dictionary 239 are shown on a server 233. However, those skilled in the art will recognize that all of the components could appear on client 199 together. Furthermore, those skilled in the art will recognize that QUERYENG 208 could appear on server 233 along with NLP component 227, and Topics Dictionary 239. The particular configuration chosen, while affecting performance, is not critical to the basic operation of the invention.

Although the present invention has been described with reference to specific embodiments, workers skilled in the art will recognize that changes may be made in form and detail without departing from the spirit and scope of the invention.

What is claimed is:

1. A method of aiding a user in searching a computer environment comprising:
   (a) receiving a search query from a user;
   (b) generating a clue stream comprised of features based in part on the search query;
   (c) providing the clue stream to a support vector machine trained to identify a search goal from a clue stream; and
   (d) identifying a search area within the computer environment based on a search goal produced by the support vector machine in response to the clue stream.

2. The method of claim 1 wherein generating a clue stream comprises generating at least one topic from a natural language parse of the search query.

3. The method of claim 2 wherein generating a clue stream further comprises generating at least one topic by comparing the search query to text found in pages on a network.

4. The method of claim 3 wherein generating a clue stream further comprises generating at least one user profile feature.

5. The method of claim 4 wherein generating a clue stream further comprises generating a scope feature based in part on the search query.

* * * * *